United States Patent
Tran

(10) Patent No.: US 10,471,314 B1
(45) Date of Patent: Nov. 12, 2019

(54) COMBINED GOLF BAG AND COLLAPSIBLE MULTI-WHEELED GOLF PUSHCART

(71) Applicant: Thinh Quang Tran, Elk Grove, CA (US)

(72) Inventor: Thinh Quang Tran, Elk Grove, CA (US)

( * ) Notice: Subject to any disclaimer, the term of this patent is extended or adjusted under 35 U.S.C. 154(b) by 0 days.

(21) Appl. No.: 16/250,877

(22) Filed: Jan. 17, 2019

Related U.S. Application Data

(63) Continuation-in-part of application No. 14/857,836, filed on Sep. 18, 2015, which is a continuation-in-part of application No. 14/336,094, filed on Jul. 21, 2014, now Pat. No. 9,162,695.

(60) Provisional application No. 61/958,327, filed on Jul. 24, 2013.

(51) Int. Cl.
| | |
|---|---|
| A63B 55/30 | (2015.01) |
| A63B 55/60 | (2015.01) |
| B62B 3/10 | (2006.01) |
| B62B 3/02 | (2006.01) |
| B62B 3/12 | (2006.01) |
| B62B 5/06 | (2006.01) |

(52) U.S. Cl.
CPC .............. *A63B 55/30* (2015.10); *A63B 55/60* (2015.10); *B62B 3/022* (2013.01); *B62B 3/102* (2013.01); *B62B 3/12* (2013.01); *B62B 5/067* (2013.01); *A63B 2055/602* (2015.10); *A63B 2210/50* (2013.01); *B62B 2205/12* (2013.01)

(58) Field of Classification Search
CPC ..... A63B 55/30; B62B 2205/12; B62B 3/102; B62B 3/12
See application file for complete search history.

(56) References Cited

U.S. PATENT DOCUMENTS

| | | | | |
|---|---|---|---|---|
| 6,814,361 | B2 * | 11/2004 | Tsu .................... | B62B 5/0083 280/43.1 |
| 7,128,333 | B2 * | 10/2006 | Reimers ................ | B62B 1/045 280/651 |
| 7,934,729 | B2 * | 5/2011 | Murphy ................ | A63B 55/00 280/47.26 |
| 9,162,695 | B2 | 10/2015 | Tran | |
| 2008/0251653 | A1 * | 10/2008 | Manus ................. | A63B 55/60 248/96 |

(Continued)

*Primary Examiner* — James A Shriver, II
*Assistant Examiner* — James J Triggs
(74) *Attorney, Agent, or Firm* — O'Banion & Ritchey LLP; John P. O'Banion

(57) ABSTRACT

A multi-wheeled golf push cart is shown that combines the functionality of a conventional pushcart and golf bag into a single piece of equipment. The cart comprises a collapsible multi-wheeled configuration and push bar. These collapsible mechanisms enable the cart to be transformed into two positions: folded or extended. The cart is also equipped with a plurality of golf club slots strategically formed into a U-shaped housing for optimized club organization and protection. For golf equipment storage space, the cart has a main console located in the push bar. In addition, the golf cart has a strap-on bag that comes with multiple pockets for additional storage. In an extended position, the cart is designed for walking similar to using a pushcart and bag combination. In a folded position, the compact designed allow it to fit securely onto the back of a motorized cart for riding, similar to a conventional golf bag.

21 Claims, 17 Drawing Sheets

(56) References Cited

U.S. PATENT DOCUMENTS

2013/0234420 A1 9/2013 Reimers
2015/0028568 A1 1/2015 Tran
2016/0303442 A1 10/2016 Tran

* cited by examiner

COMBINED GOLF BAG AND COLLAPSIBLE MULTI-WHEELED GOLF PUSHCART

CROSS-REFERENCE TO RELATED APPLICATIONS

This application is a continuation-in-part of U.S. patent application Ser. No. 14/857,836 filed on Sep. 18, 2015, incorporated herein by reference in its entirety, which is a continuation-in-part of U.S. patent application Ser. No. 14/336,094 filed on Jul. 21, 2014, now U.S. Pat. No. 9,162,695, incorporated herein by reference in its entirety, which claims priority to, and the benefit of, U.S. provisional patent application Ser. No. 61/958,327 filed on Jul. 24, 2013, incorporated herein by reference in its entirety.

STATEMENT REGARDING FEDERALLY SPONSORED RESEARCHOR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to a golf cart, and more particularly to a combination golf pushcart and golf bag.

2. Background Discussion

The game of golf generally involves the golf course, the golfer, and the golf equipment. Today, golf clubs and related golf accessories are generally being transported on the golf course by golf bags. These golf bags typically come with either hand and/or shoulder straps. Golfers who choose not to manually carry their golf bags by hand or over the shoulder are limited to a few alternatives: 1) strap the golf bag to a conventional wheeled push or pull cart; 2) Strap the golf bag to a motorized cart; or 3) Hire a caddy to carry the golf bag. The third option, unfortunately, is very limited since most public golf courses do not have personal caddy services.

Riding a motorized cart is a more popular choice for most golfers. For those that elect to walk the course, using a conventional pushcart is a practical and popular option. When the two-wheeled pull cart was first introduced to the game, it wasn't very well received. It was perceived as being lazy or less "manly", especially when golf was not considered a real "sport" by the non-golfing public.

Over the years, golf bag designs have continued to evolve. They are available in smaller and lighter sizes. Some golfers, however, still prefer the oversized cart bag for its storage capacity. The disadvantage of a golf bag, regardless of its size, is its portability. A golfer walks an average of five miles during a round of golf. To cover this distance, a golfer will either have to carry the golf bag by hand or over the shoulder; or rely on other assisted means such as a manual pushcart or motorized apparatus. As mentioned, golf bags themselves have been redesigned to be lighter and smaller. However, with the golf clubs and golf-related items added, it will become heavy and cumbersome to haul around. With all the golf clubs and golf related items, a fully loaded golf bag can take its toll on the golfer's body during the round. For this reason, many golfers choose to let the pushcart do the hard work so that he/she could have more energy for the game itself.

More recently, the three-wheeled golf cart has become popular. Today, walking the course is common and gaining more popularity. Collegian golfers in recent years have also opted to use golf pushcarts in competitions.

The choice to use the golf pushcart, however, comes with many disadvantages and inconveniences. Storage is the biggest hassle. Keeping a pushcart in the trunk is an inconvenience as it leaves little room for additional storage space. It is nearly impossible to fit four sets of cart and bag combinations into the trunk of a standard midsize car. This is problematic when it comes to carpooling. Over the years, existing pushcarts have been redesigned to fold into smaller configurations. Nonetheless, it is still not small enough and taking up valuable storage space.

Another disadvantage of using a push cart is the loss of time. Assembling and disassembling the extra pieces of equipment before and after the round is very time consuming. Upon arrival at the golf course, a golfer must first set the cart from a folded to extended position, then proceed to taking the steps necessary to make sure the bag is properly and securely fastened into the extended cart. After the round of golf, the golfer needs to reverse this time-consuming process all over again, prior to stowing the two cumbersome pieces of equipment.

Current golf bags, despite endless innovations and improvements over the years, still have their flaws. When strapped onto the motorized golf cart, they don't stay put. As a result, golfers often have to take the extra time to adjust the strapped bag from twisting or falling out of place within the designated stowing parameter of the riding cart. The constant rattling and twisting of the bag during the round will take its toll on the golf bags. Because most bags are primarily configured to be more lightweight, they generally lack insufficient rigidity to withstand the constant force and abrasion. Most golf bags also do not provide sufficient club projection or organization. The golf clubs are bunched up in the middle of the bag, making it hard to keep track of all the clubs. They also rattle and bang up against each other causing them scratch and get dinged up.

These disadvantages and inconveniences often steer golfers away from walking the course altogether. Accordingly, a piece of equipment that would enable golfers to walk or ride with a single, user-friendly manner would be highly desirable.

BRIEF SUMMARY

One aspect of the present description is a combination golf bag and push cart that comprises multi-wheels, a tri-tier chassis body, and a push bar assembly. The cart is designed to be folded into two positions: a first folded position for storage & riding; and a second extended position for walking. Through the use of the axles and brackets, the two rear wheels are installed onto the trailing arms, which are then installed onto the lower chassis brackets. The center wheel is installed onto the center fork, which is attached onto the lower chassis. This lower chassis is fastened to the center chassis. The center chassis is then fastened to the upper chassis. The push bar assembly is attached to the upper chassis through the use of two mounting collar brackets. The push bar is equipped with an integrated tray console for storing golf-related and personal items. An insulated cooler bag and snack bag is also mounted onto the body of the cart. The most storage space can be found on the golf bag, which has multiple pockets. The bag is detachable from the cart for customized personalization. The cart is also equipped with a brake system for parking the cart during walking mode.

An aspect of the present description is an all-in-one golf cart that in its folded position is comparable to the size of a conventional golf bag and fits securely behind a motorized riding cart similar to, or more advantageously than, a traditional golf bag. In an extended position, the cart will operate similar to a golf bag strapped onto a wheeled pushcart.

The cart of the present description provides a practical and convenient alternative to the traditional method of using a conventional golf bag and pushcart combination. In addition, using the all-in-one golf cart has many advantages compared to the traditional way of transporting golf equipment on and off the course.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

FIG. 1 through FIG. 17 generally illustrate a combination golf bag and multi-wheeled golf pushcart 100 (hereinafter referred to as "cart 100") that combines the functionality of a conventional pushcart and golf bag into a single piece of equipment. Cart 100 generally comprises a number of structural components/assemblies, which are detailed individually below. While each of the below components/assemblies all provide unique utility and benefit, it is appreciated that the cart 100 of the present invention may comprise any combination of one or more of these components, and is not in particular limited to the specific combination detailed in the figures.

1) Retractable Wheel Assemblies.

Figure 3:
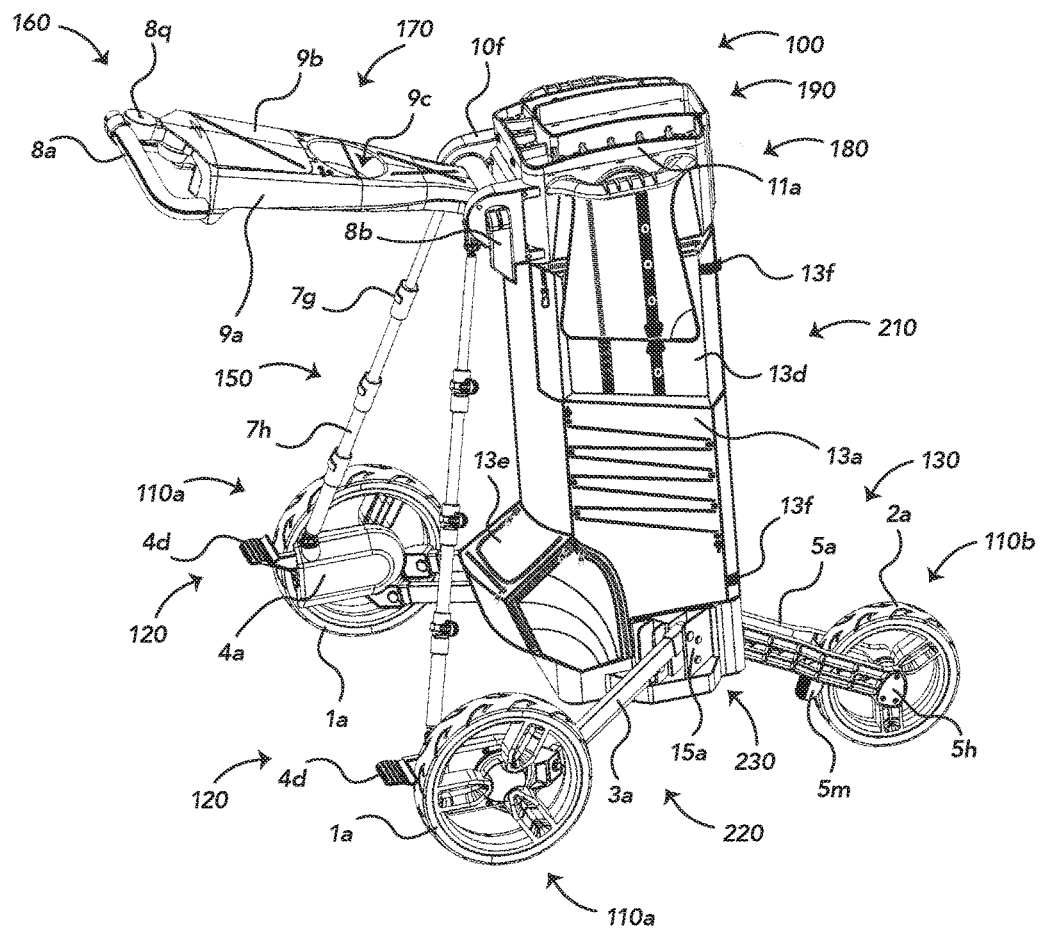
FIG. 3 shows a side perspective view of the cart of FIG. 1, shown with golf bag installed.
Figure 10:
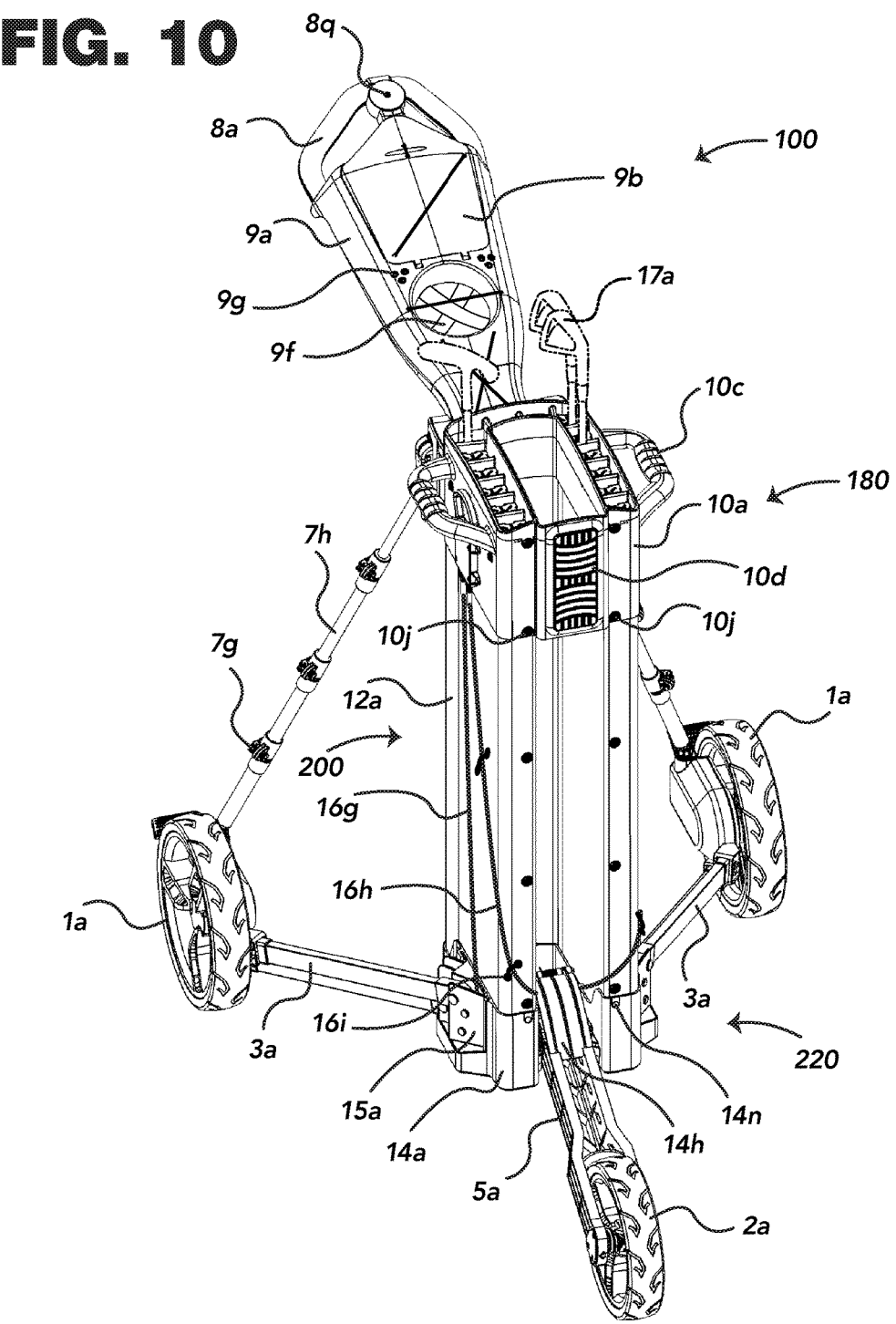
FIG. 10 shows a front perspective view of the cart of FIG. 1, shown with a few golf clubs (golf bag is not shown).

Cart 100 comprises a pair of retractable rear wheel assemblies 110*a* and retractable center wheel assembly 110*b*, each comprising respective wheels 1*a* and 2*a* as shown in FIGS. 3, 4, 7, and 12, which are rotatable and provide support for the cart 100 above ground surface. Side wheels 1*a* and center wheel 2*b* have the same rotational axis allowing the cart 100 to roll on a straight line. The broad triangular distances between the three wheels when fully extended for walking as shown in FIGS. 3 and 10 provide a wide and stable base for the cart 100 in the extended position for walking. This wide wheel base enables the cart 100 to remain self-stabilized. Therefore, it saves the golfer energy by not having to support or balance the cart 100 during walking. This self-stability also allows the cart 100 to run on its own, with forward momentum or, while rolling down the slopes on the golf course.

Figure 12:
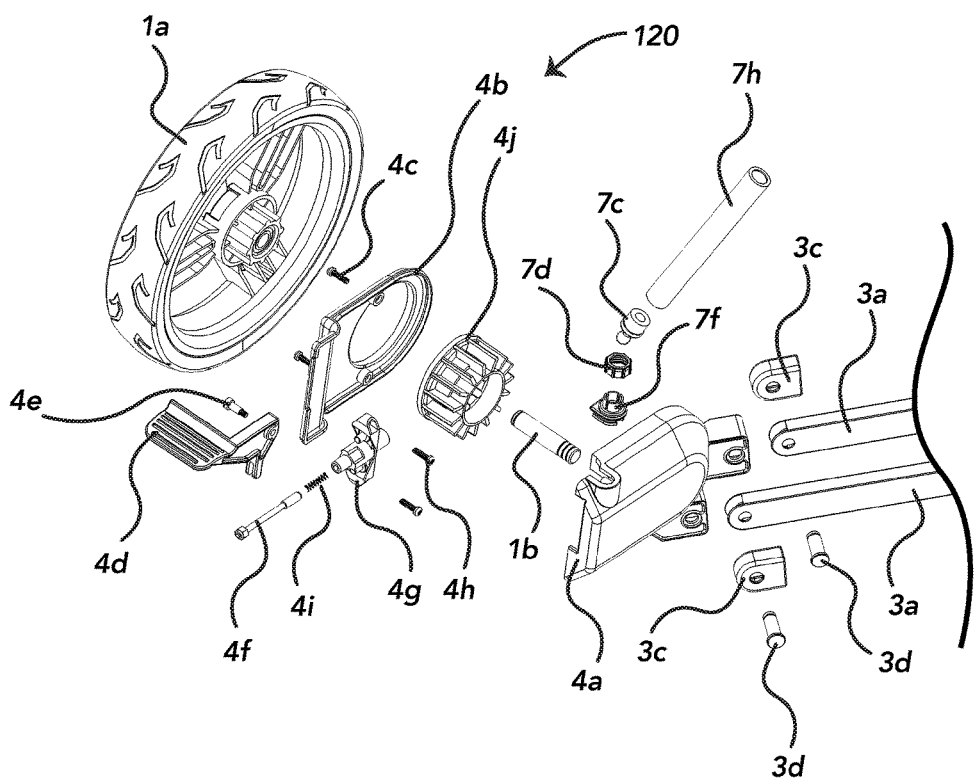
FIG. 12 shows an exploded view of the of the golf cart's side wheel and foot brake subassemblies.

Wheels 1*a* are attached to the cart 100 using the side wheel axles 1*b*, which are connected to the foot brake main housing 4*a* as shown in FIG. 12. The foot brake main housing 4*a* is then connected to the trailing arms 3*a* using the trailing arm rear pivot axles 3*d*, also shown in FIG. 12. To connect the two side wheels 1*a* to the body of the cart 100, trailing arms 3*a* are then connected to the wing brackets 15*a* shown in FIGS. 10 and 12. Wing brackets 15*a* are attached to the lower chassis 14*a* in FIG. 15 using wing brackets fasteners 15*h*. The center wheel 2*a* in FIG. 16 is attached to the cart 100 using the center wheel axle 2*b*, also seen in FIG. 16. The center wheel axle 2*b* is then attached to the front fork 5*a* in FIG. 16. Shown in FIG. 16, a set of center wheel axle spacers 2*c* is attached to the center wheel axle 2*b* to help improve the rotational motion of the center wheel 2*a*. The front fork 5*a*, which provides support for the center wheel 2*a*, is attached to the body of the cart 100 using a front fork pivot axle 5c shown in FIG. 16. The fork pivot axle 5c in FIG. 16 is connected to front fork mount bracket top cover 14f, also shown in FIG. 16. Each side wheel 1a rotatably supported from the lower chassis 14a using the trailing arms 3a shown in FIG. 10, which pivots relative to the wing bracket 15a.

Figure 2:
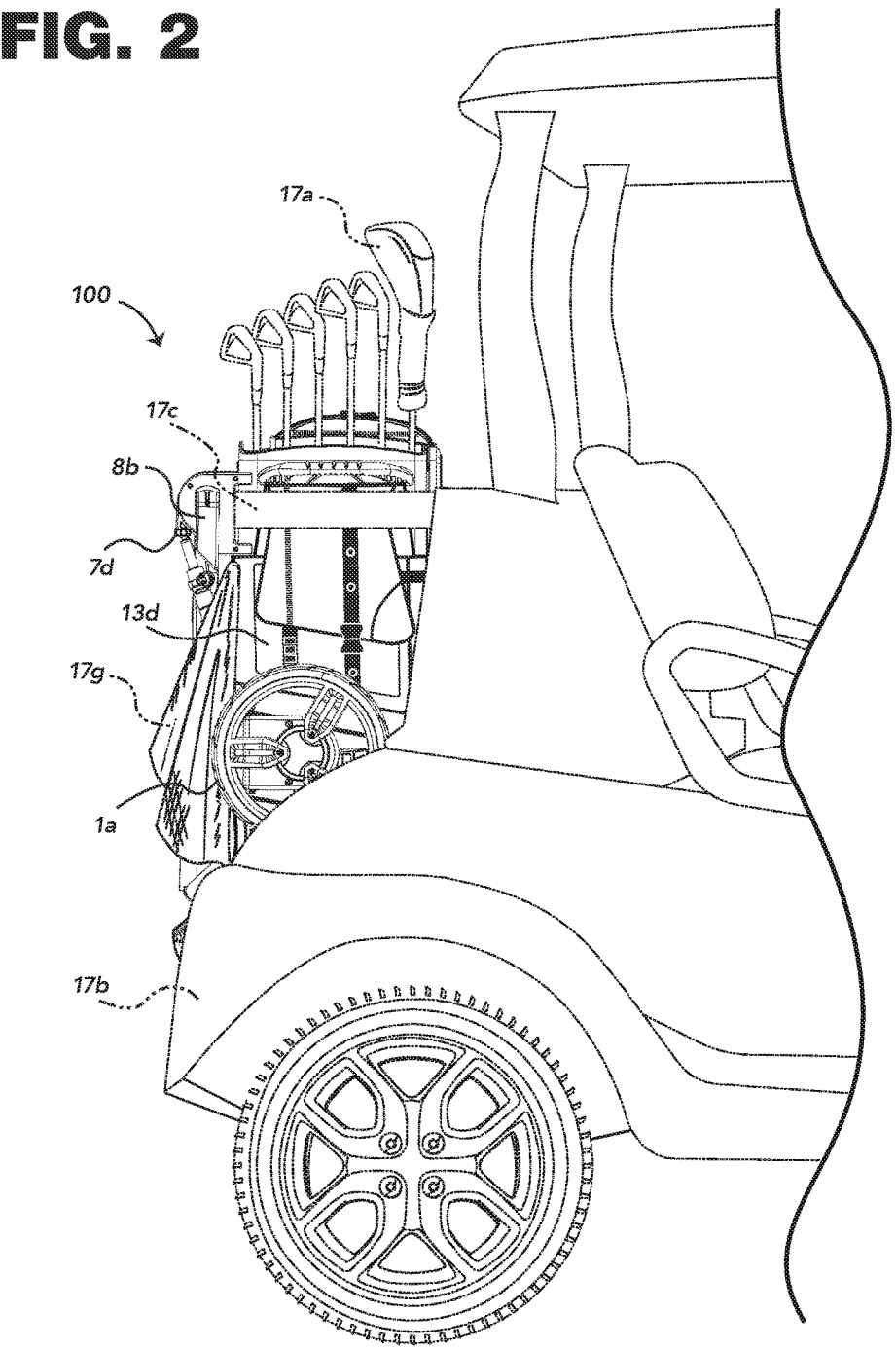
FIG. 2 shows a side view of the cart of FIG. 1, in a folded position, being strapped onto the back of a motorized riding cart.
Figure 7:
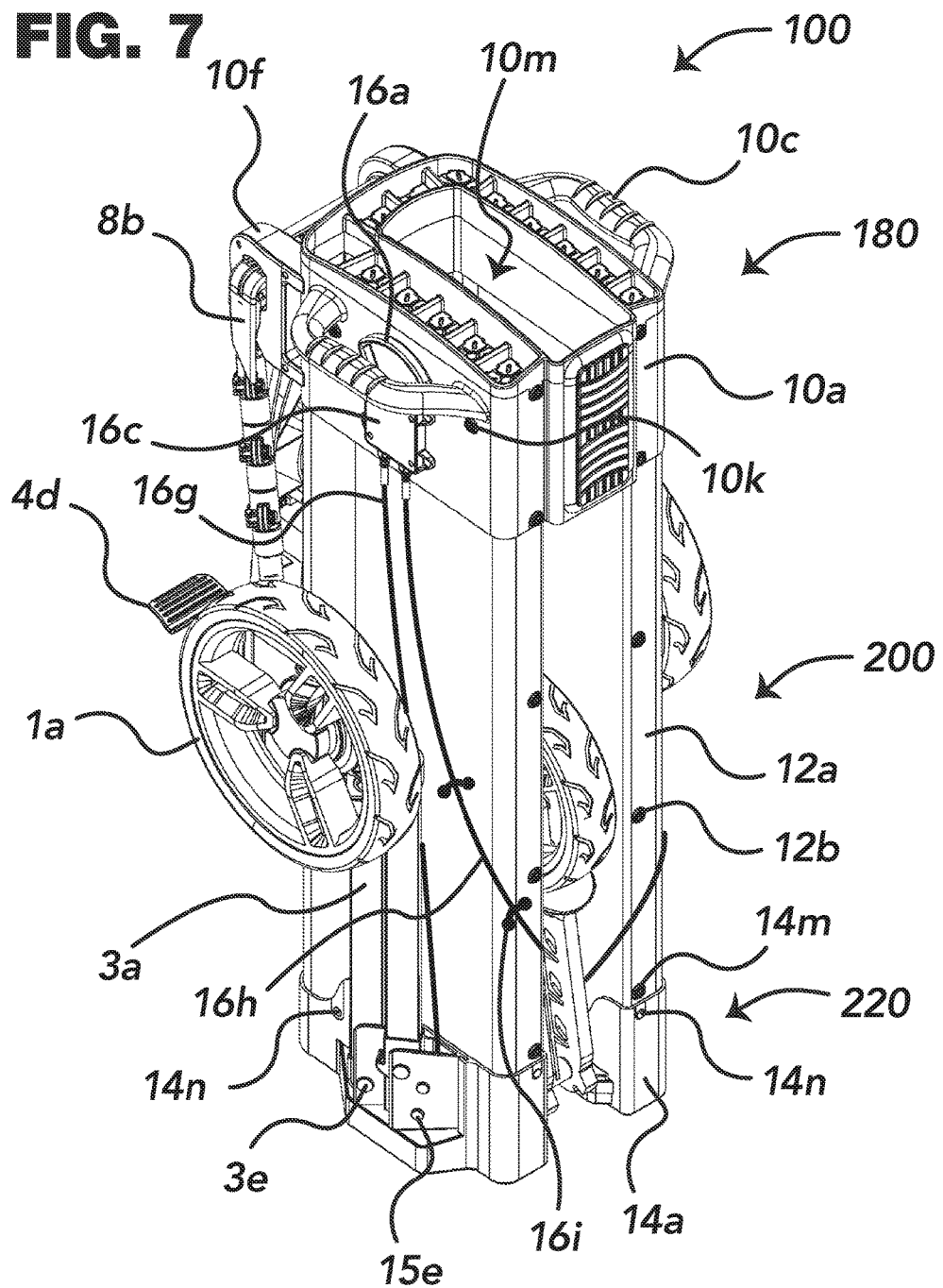
FIG. 7 shows a front perspective view of the cart of FIG. 2 (golf bag and equipment are not shown).

Trailing arms 3a as shown in FIGS. 7,10, and 12 work in conjunction with the rotatable side wheels 1a and center wheel 2a, also shown in FIG. 10, to provide support for the cart 100 above ground surface. In addition, they allow the cart 100 to be transformed into two collapsible positions: folded (for storage and riding) as shown in FIG. 2 and extended (for walking) as shown in FIG. 3. Each set of trailing arms 3a is coupled with two end caps 3c and two lock caps 3b. The assembled trailing arms 3a are attached to the cart 100 via the wing brackets 15a using the trailing arm front pivot axles 3e. Trailing arms 3a are also used for the installation of the main foot brake housing 4a as shown in FIG. 12. Main foot brake housings 4a are attached to the trailing arms using the trailing arm rear pivot axles 3d shown in FIG. 12.

2) Foot Brake Assembly

Each of the retractable wheel assemblies 110a comprise foot brake assemblies 120, as shown in the exploded view of FIG. 12. During a round of golf, a golfer will often need to set the cart 100 to park, preventing it from rolling away. The foot brake assembly 120 includes the foot brake main housing 4a, main housing covers 4b, main housing fasteners 4c, foot brake pedals 4d, pedal axles 4e, stop pins 4f, stop pin housing 4g, brake fasteners 4h, brake springs 4i, and brake disks 4j. The foot brake pedal 4d is attached to the brake main housing 4a using the foot brake pedal axle 4e. The brake springs 4i and brake stops pin 4f in are then installed within the stop pin housing 4g shown in FIG. 12. The brake stop pin housing 4g is attached to the brake main housing 4a using the brake fasteners 4h. The brake disks 4j are snap fitted onto the side wheels 1a hubs. The brake main housing cover 4b is installed onto the main housing 4a using the main housing fasteners 4c. The main housing covers 4b enclose all brake subassemblies. In additional to setting the cart 100 to park, the foot brake main housing 4a is used for the installation of the side wheel axles and the trailing arm rear pivot axles 3d as shown in FIG. 12.

3) Front Fork Assembly

Figure 11:
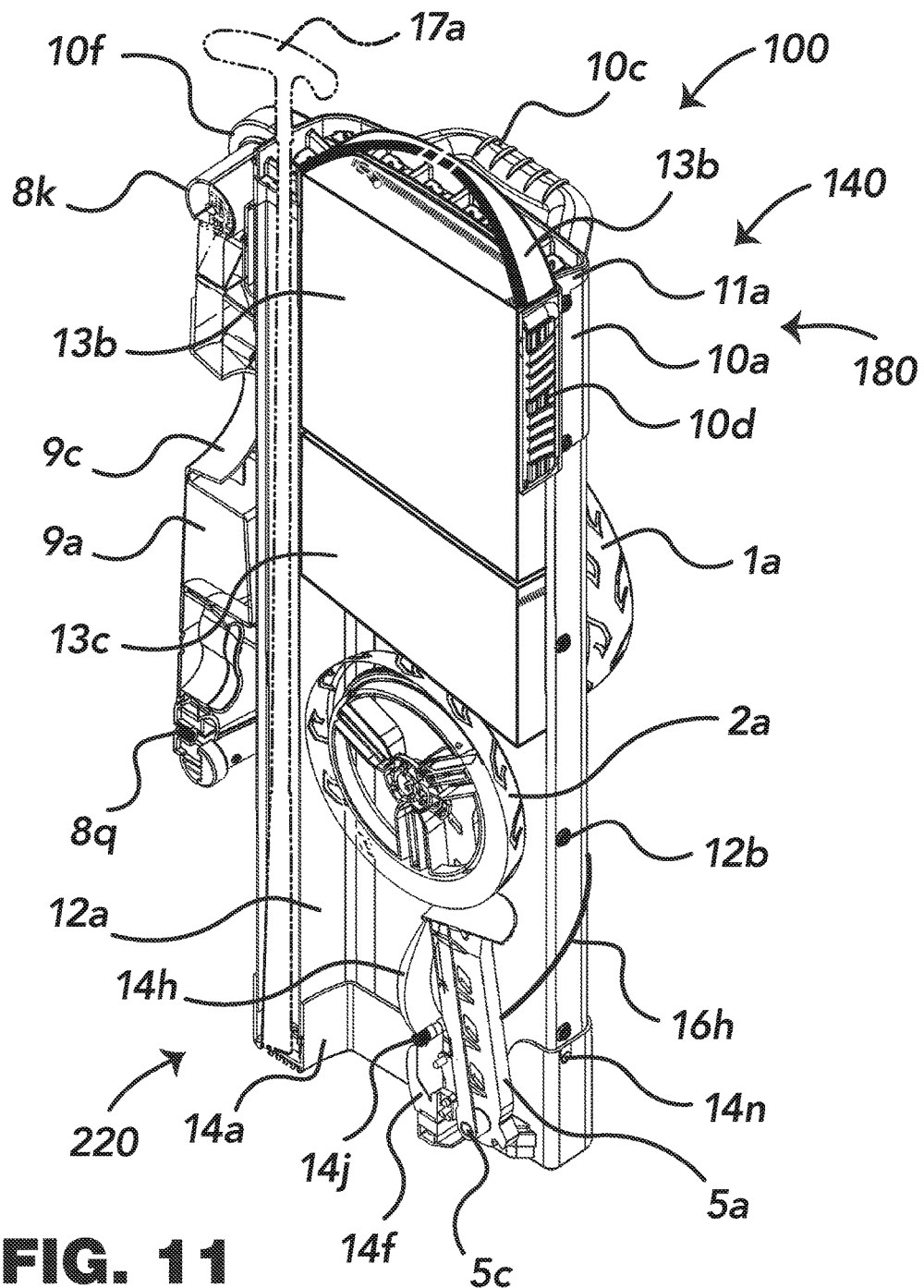
FIG. 11 shows a cross-sectional side view of the cart of FIG. 7, shown with one golf club, insulated cooler bag, and snack bag (golf bag is not shown).

The center wheel assembly 110b comprises a front fork assembly 130, which includes a front fork 5a shown in FIGS. 10, 11, and 16, fork axle bearings 5b, fork pivot axle 5c, wheel alignment housing 5d, alignment guides 5e, alignment guide bolts 5f, alignment covers 5h, alignment cover fasteners 5i, folded position lock steps 5j, extended position lock steps 5k, and mudguard 5m. The rotatable center wheel 2a is installed to the front fork shown in FIG. 10 using center wheel axle 2b and axle spacer 2c in FIG. 16, supporting the remainder of the cart 100's weight not carried by the two rotatable side wheels 1a. Fork pivot axle 5c and axle bearing 5b in FIG. 16 connect the front fork 5a to the fork mount bracket top cover 14f shown in FIG. 16. The alignment guides 5e are fixed to the front fork 5a and secured in position using the alignment covers 5h. Also shown in FIG. 16, center wheel axle 2b is inserted into the alignment guide 5e. The alignment guide 5e is equipped with nuts and bolts that can be adjusted left or right to straighten the rotational direction of the center wheel 2a. The front fork 5a is designed with two sets of locking steps: folded 5j and extended 5k. Shown in FIG. 3, a mud guard 5m may also integrated into the front fork design.

4) Front Fork Locking Assembly

The center wheel assembly 110b further comprises a front fork locking assembly 140 shown in FIG. 16 to help set the fork 5a in folded and extended positions. The locking assembly 140 has a lock bracket 6a, lock bracket pivot axle 6b, a lock bracket spring 6c, a bracket cable pin 6d, and lock pin 6e. The lock bracket 6a is attached to the front fork mount bracket top cover 14f using the lock bracket pivot axle 6b. The lock bracket cable pin 6d is fixed to the lock bracket 6a. When the front fork trigger cables 16h, shown in FIGS. 7 and 10, are pulled, it will activate the lock bracket 6a, which in turn, engage and disengage the lock pin 6e. The lock pin 6e is attached to the lock bracket 6a also shown in FIG. 16. The lock bracket spring 6c, in conjunction with the front fork trigger cables 16h, will pivot the lock pin 6e to mate with the folded position lock steps 5j and extended position lock steps 5k. This will set the front fork 5a in the desired position, folded as shown in FIG. 7 or extended seen in FIG. 3.

6) Stablizer Assembly

Figure 5:
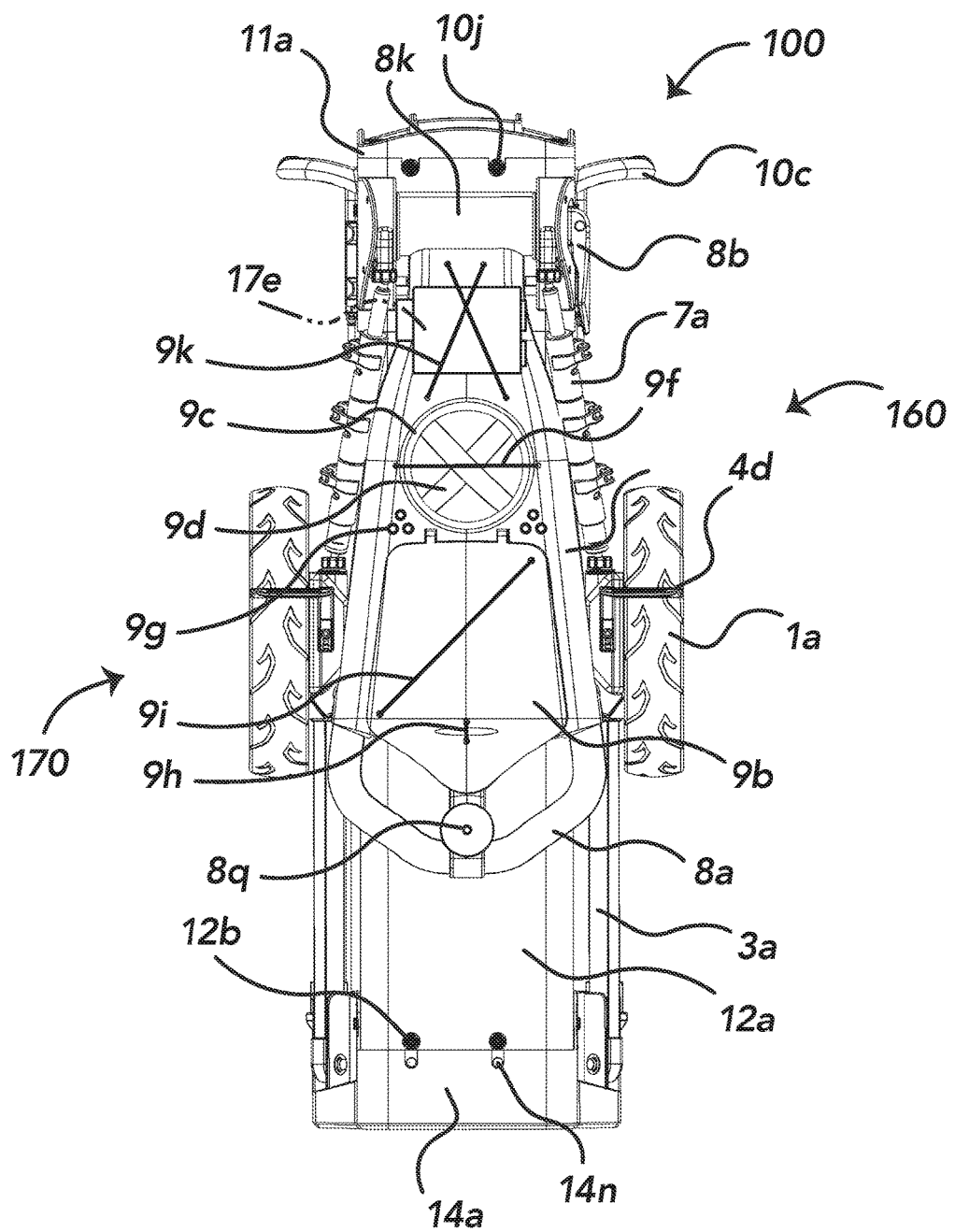
FIG. 5 shows a rear view of the cart of FIG. 2 (golf bag and equipment are not shown).
Figure 6:
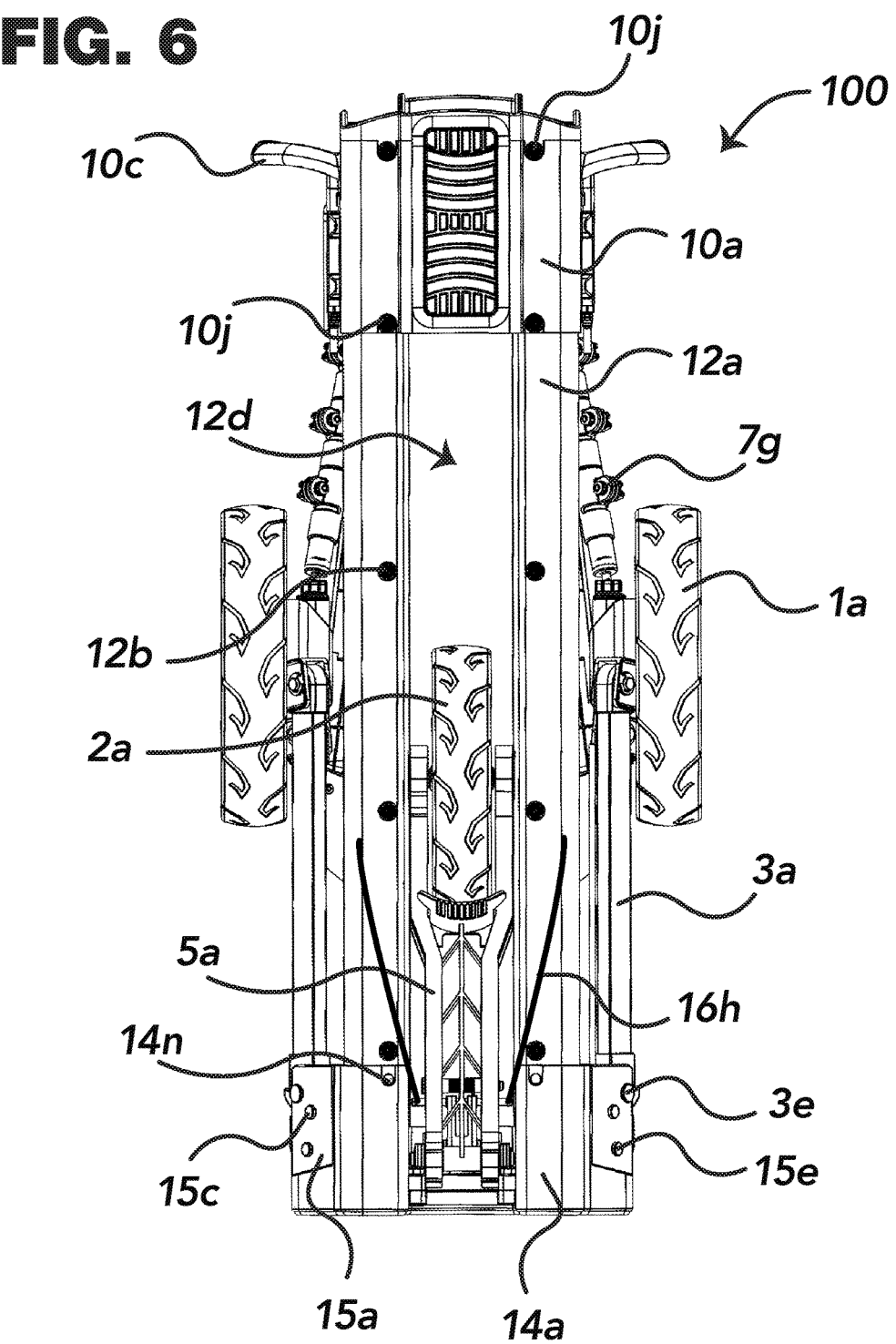
FIG. 6 shows a front view of the cart of FIG. 2 (golf bag and equipment are not shown).
Figure 14:
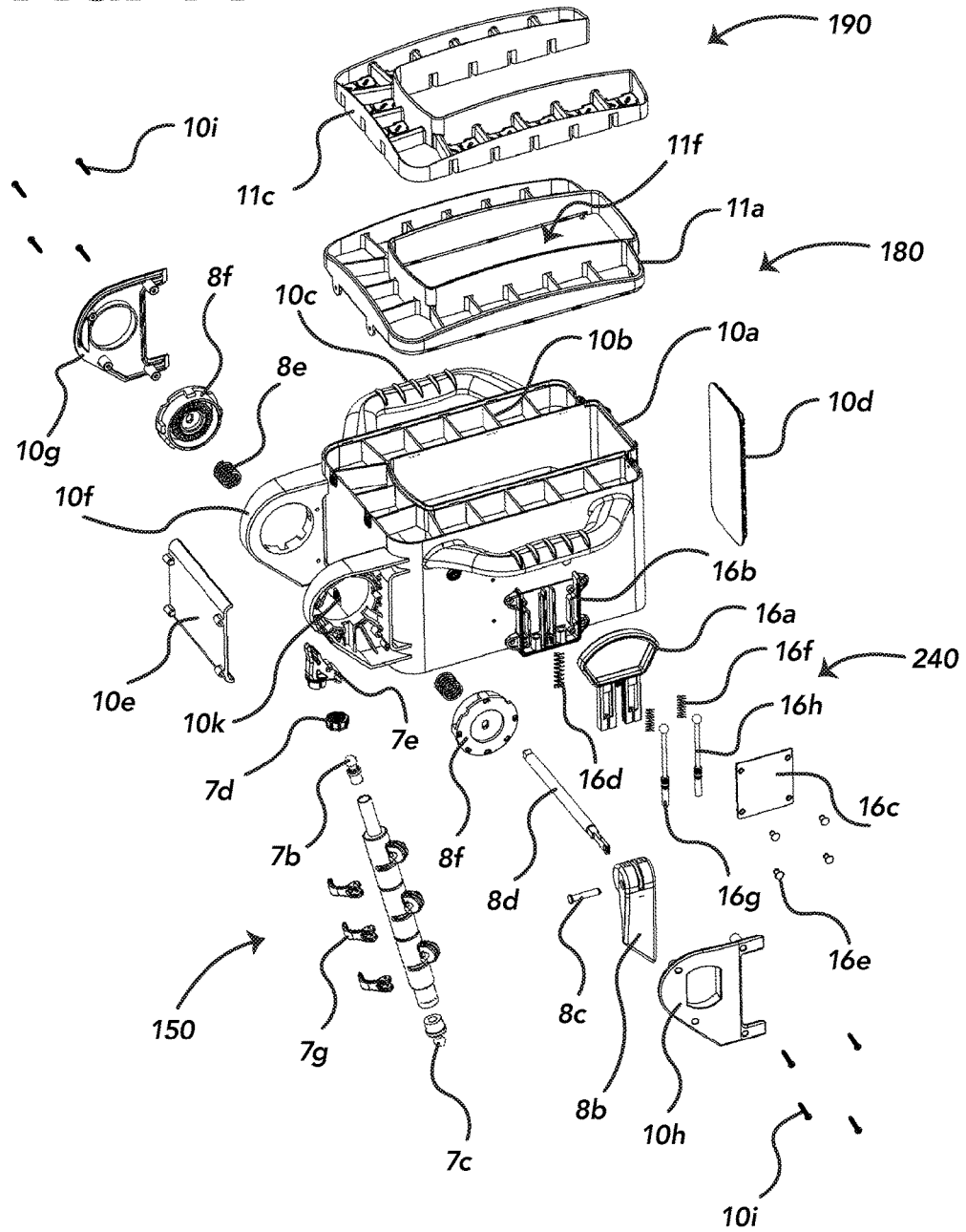
FIG. 14 shows an exploded view of the of the golf cart's upper chassis, upper retainer club protection system, side trigger, stabilizer, and push bar main body subassemblies.

A pair of stabilizer assemblies are provided, each having a stabilizer body 7a as shown in FIGS. 10 and 14 that provide additional support for the cart 100's weight load when it is being used in the extended position. They also work in conjunction with the foot brake main housing 4a and trailing arms 3a to set the side wheels 1a in folded position. The stabilizer's body 7a preferably comprises of four telescopic tubes 7h (FIG. 10). The tubes 7h are configured to fold and extend within themselves telescopically. The stabilizer clamps 7g are fixed around the telescopic tubes 7i and lock the telescopic tubes 7h at the desired positions, folded shown in FIG. 5 and extended in FIG. 3. The stabilizers 7a are capped off with ball join inserts 7b and 7c as shown in FIG. 14. To attach the stabilizer 7a to the cart 100, the ball joint inserts 7b and 7c are fixed to the socket housing top 7e and socking housing bottom 7f. Two sets of socket housing caps 7d are screwed on to socket housing 7e and 7f to secure the assembled stabilizer 7a. The socket housings are fixed to the cart 100 as shown in FIGS. 5 and 14. The socket housings 7e and 7f are installed at the push bar mount brackets 10f and footbrake main housing 4a.

7) Push Bar Assembly

Figure 1:
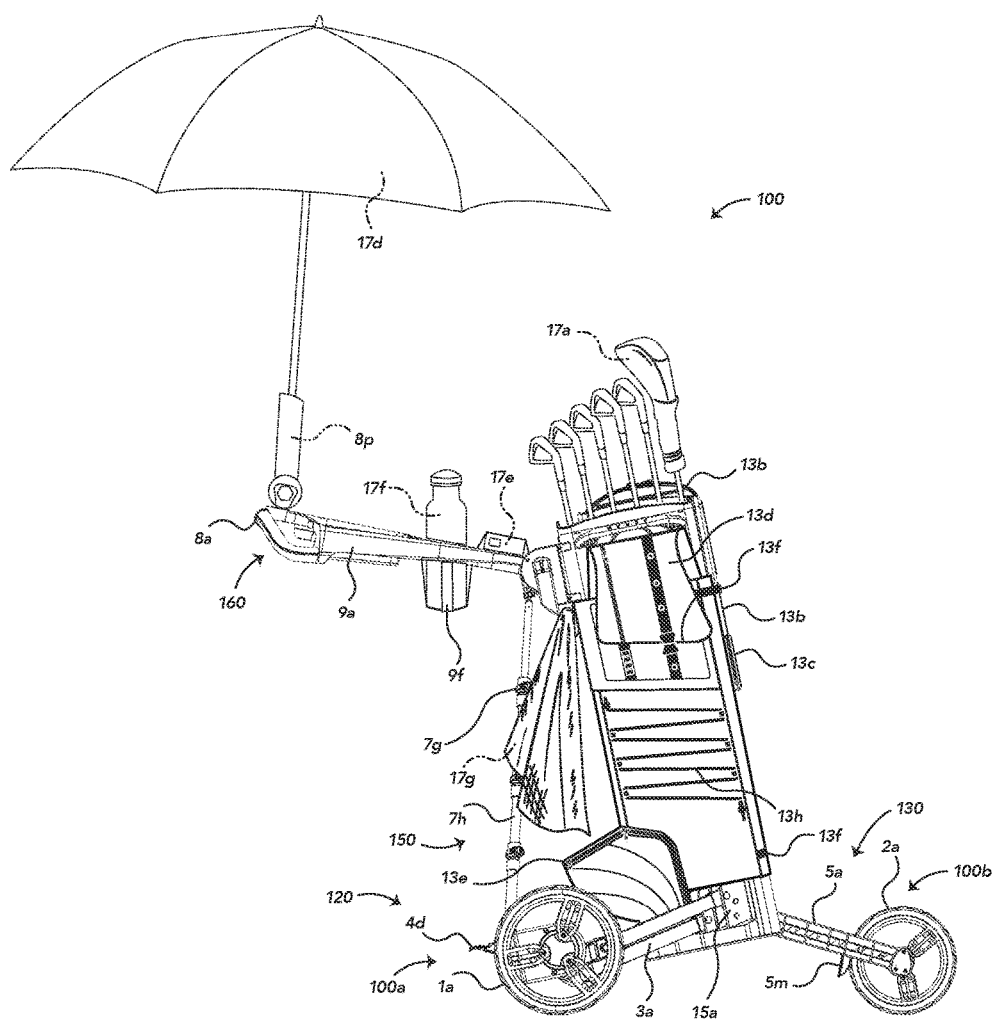
FIG. 1 shows a side view of the cart, in an extended position for walking, shown with golf bag installed and golf equipment.

A push bar assembly 160 is provided comprising a push bar main body 8a (shown in FIGS. 1, 3, 5, 10, and 13) providing a push bar handle coupled by two sets of push bar handle inserts 8h and 8i. Also shown in FIG. 10, the push bar handles are designed for pushing and maneuvering the cart 100 during walking mode. The push bar handles can also be used as extra lifting leverage when it is in folded position shown in FIG. 5. When stowing, it is best to use the push bar handles in conjunction with side handles 10c also shown in FIG. 5 for lifting and handling the folded cart 100. As shown in FIG. 1, located at the center of the push bar handle, an umbrella holder mount insert 8q is designed for mounting an umbrella holder 8p shown in FIG. 1. An umbrella 17d in FIG. 1 can be inserted into the umbrella holder 8p to provide shade and shelter as needed when the cart 100 is used in extended position for walking. The push bar main body 8a also includes a tray console 9a shown in FIGS. 5, 10, and 13. The push bar main body 8a also includes the clamp pivot assembly collectively comprising components 8b-8g shown in FIGS. 13 and 14, which includes an adjustment lever 8b, adjustment lever pivot axle 8c, tension rod 8d, gear springs 8e, side gears 8f, and center gears 8g. The clamp pivot assembly works in conjunction with the push bar main body 8a to allow the golfer the option to adjust the push bar handles to different heights for ergonomic optimization.

Figure 4:
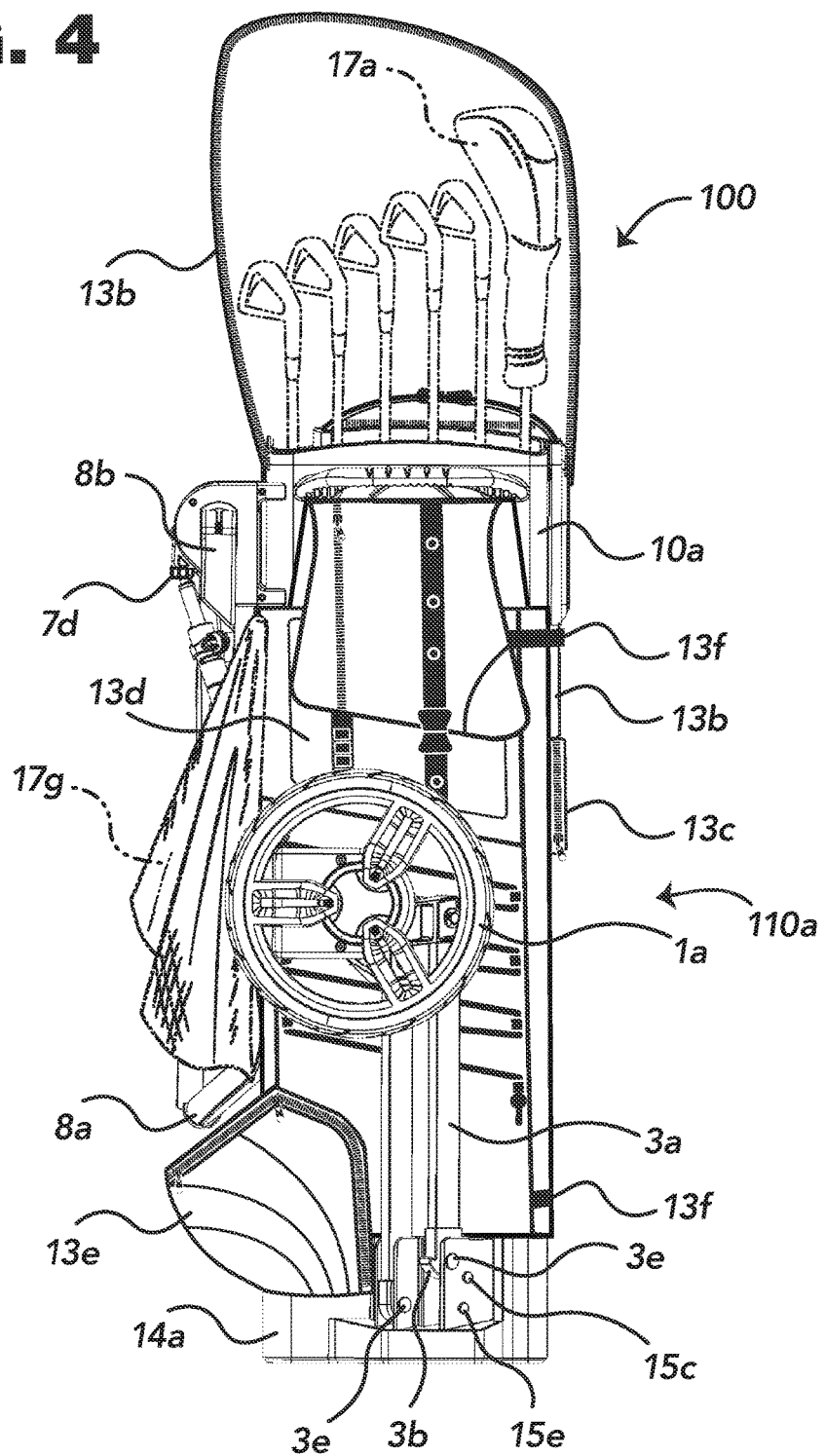
FIG. 4 shows a side view of the cart of FIG. 1, in a folded position for storage and riding, shown with golf bag installed and golf equipment.

Height adjustments can be achieved using the adjustment lever 8b as shown in FIG. 3. The adjustment lever 8b pivots at the adjustment lever pivot axle 8c vertically upward and downward to actuate the push bar tension rod 8d. The push bar tension rod 8d locks and releases the side gears 8f and center gears 8g. This action causes the push bar main body to be locked at multiple desired positions. To set the push bar main body 8a in a locked position, adjustment lever 8b is clamped down as shown in FIG. 4. The push bar main body 8a pivots up to 180 degrees, perpendicular to a long axis of the cart 100 when it is transitioned between folded and extended positions shown in FIGS. 5 and 10. The push bar main body 8a is attached to the cart 100 at the push bar mount brackets 10f located on the upper chassis 10a as shown in FIG. 3.

7) Pushbar Tray Assembly

Figure 13:
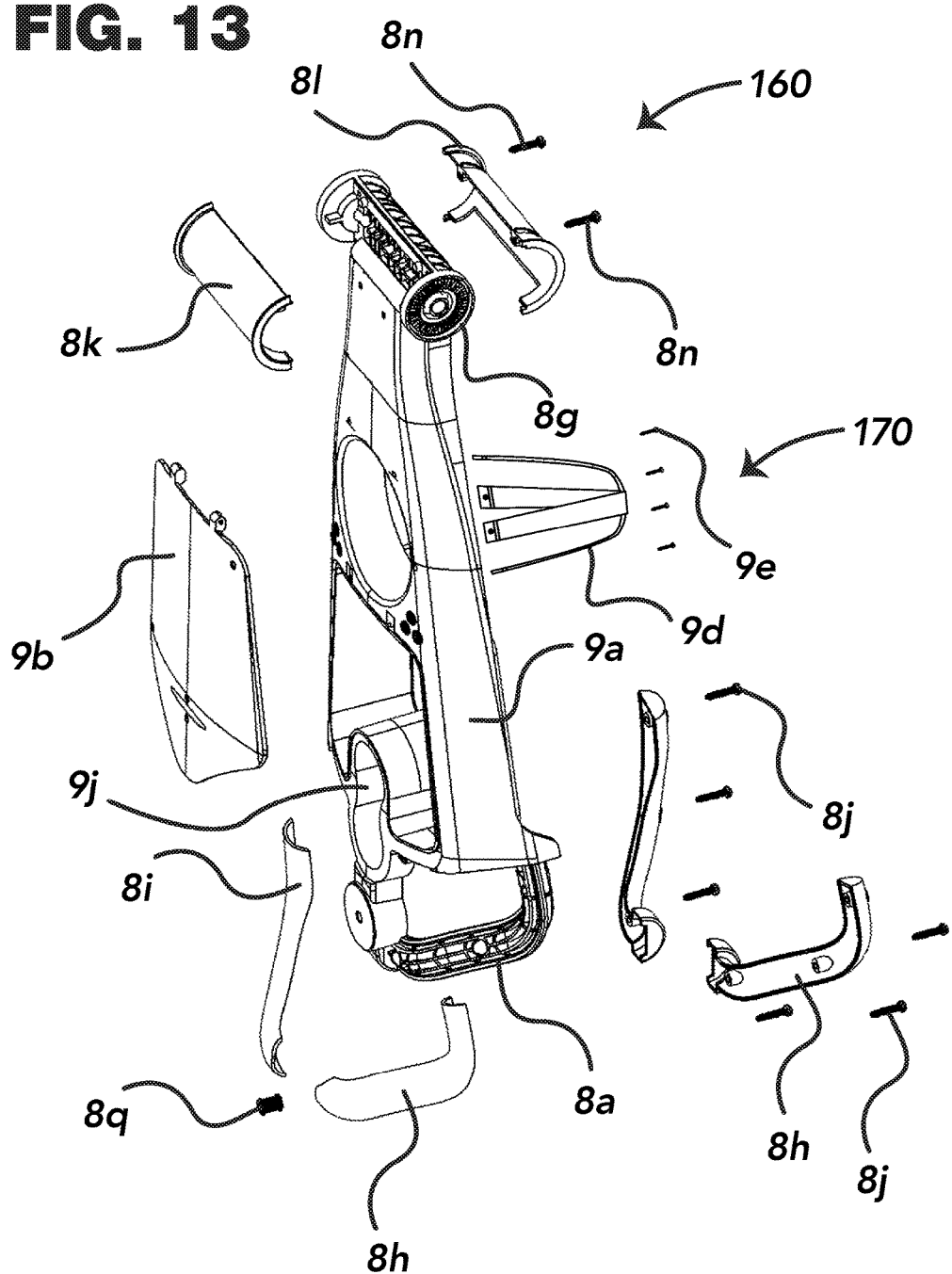
FIG. 13 shows an exploded view of the of the golf cart's push-bar main body and tray console subassemblies.

The push bar tray assembly 170 comprises a tray console 9a, and is a subassembly of the push bar assembly 160 shown in FIGS. 3, 5, and 13. Tray console 9a is conveniently located within the golfer's reach when the cart 100 is used in walking mode as shown in FIG. 3. Tray console 9a includes the following sub components: a tray lid 9b, beverage holder 9c, beverage holder bottom liner 9d, beverage holder strap 9f, golf tee holders 9g, pencil holder strap 9h, scorecard holder strap 9i, golf ball holder 9j, and rangefinder/electronic device strap 9k. These sub components together provide storage space needed for golfer's essential and frequently used items.

8) Upper Chassis Assembly

Upper chassis assembly 180 comprises an upper chassis 10a as shown in FIGS. 7 and 14, and has a center cavity 10m formed by a U-shaped configuration. Center cavity 10m as seen in FIG. 7 provides the space needed for the installation of an insulted cooler bag 13b. Upper chassis 10a includes at least two side handles 10c shown in FIGS. 3, 6, and 14 for lifting and handling of the cart 100. Lift handles 10c also provide protection for the golf clubs in case the cart 100 is accidentally knocked and falls over onto the ground. Upper chassis 10a is also equipped with golf club dividers 10b to separate each club for optimized organization as shown in FIG. 14. Upper chassis 10a also has an impact bumper 10d shown in FIGS. 10, 11, 14. Impact bumper 10d is mounted onto the chassis using the club protection assembly 190 as shown in FIGS. 11 and 14. The impact bumper absorbs the rattling and abrasion when the cart 100 is strapped onto the back of a motorized riding cart 17b (FIG. 2). A cart strap cover 10e, shown in FIG. 14, is also installed onto the upper chassis to help guide the cart 100 strap 17c around the upper chassis 10a as shown in FIG. 2. Upper chassis 10a has two push bar mount brackets 10f. As shown in FIG. 14, mount brackets 10f are designed for the installation of the push bar main body 8a. The push bar mount bracket 10f has a set of mount bracket covers 10g and 10h. The mount bracket covers 10g and 10h are installed onto the push bar mount brackets 10f using the mount bracket cover fasteners 10i. Upper chassis 10a also has a series of male snap buttons 10j for the installation of the rain cover 13g and golf bag 13a as shown in FIG. 4. The entire upper chassis assembly 180 is attached to the center chassis 12a using a series of rivet fasteners 10j. Together, the three chassis: upper 10a, center 12a, and lower 14a make up the main structure or chassis of the golf cart 100 as shown in FIG. 10.

9) Club Protection Assembly

Figure 9:
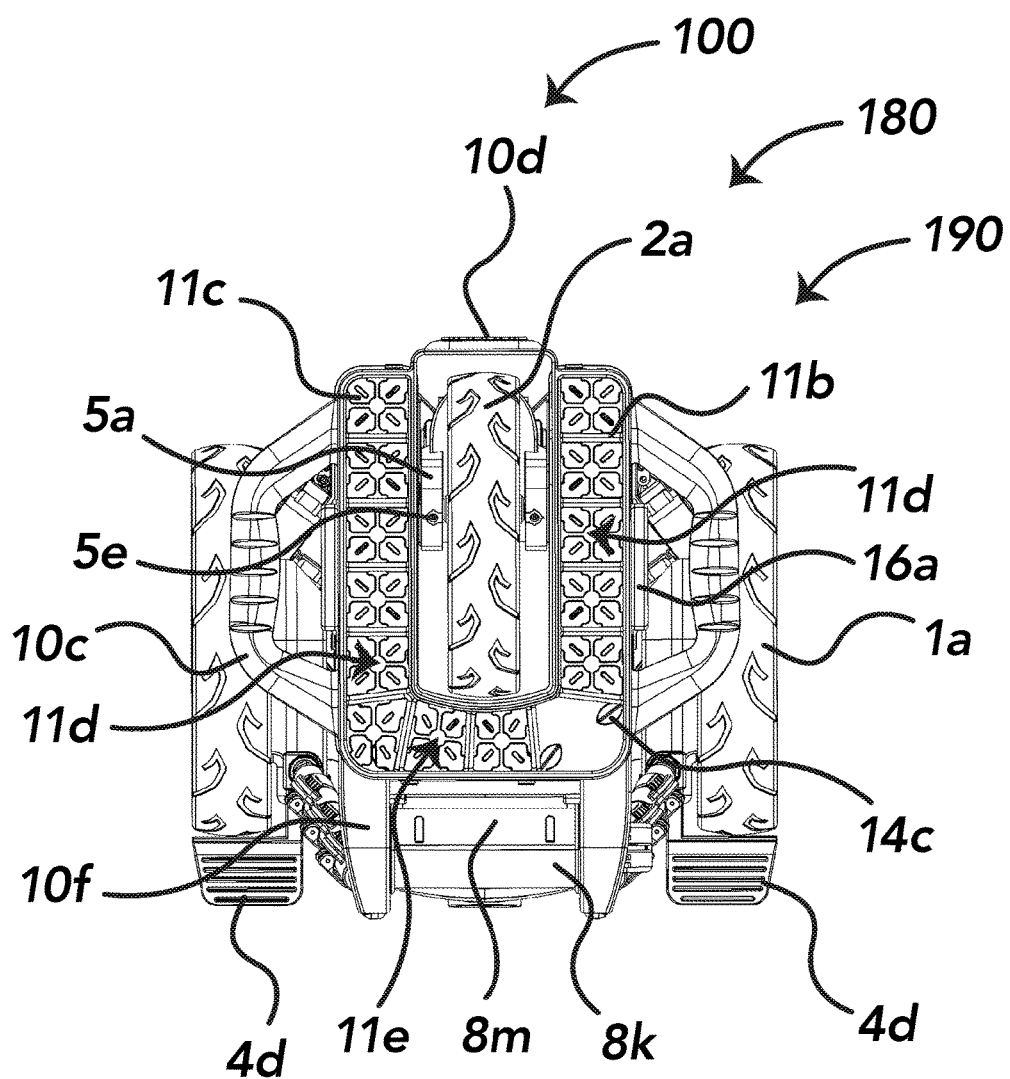
FIG. 9 shows a top view of the cart of FIG. 5 also in a folded position for storage and riding (golf bag and equipment are not shown).

Club protection assembly 190 comprises an upper retainer 11a shown in FIGS. 9, 11, and 14, which includes a series of golf club dividers 11b to keep golf clubs separated. As shown in FIG. 9, golf club dividers 11b forms two sets golf club slots; perimeter golf club slots 11d and center golf club slots 11e. Together, the two sets of golf club slots has a total of 14 club slots formed in a U-shape configuration as shown in FIG. 9. The club slots are defined by two sets of perimeter slots 11d, which includes a left set and right set of club slots, and center club slots 11e shown in FIG. 9. The perimeter club slots 11d are spaced laterally from each other along a single left and right line to facilitate organization of clubs 17a, shown in FIGS. 9 and 10. One of the perimeter club slots 11d has a larger aperture/diameter, such that a putter with an oversized grip can be accommodated. The two center club slots 11e shown in FIG. 9 are strategically placed between the perimeter club slots 11d to provide convenient access to the two most frequently used golf clubs in an average round of golf: the wedges. Therefore, the placement of these two clubs on the cart 100 (isolating them from the other perimeter clubs) makes it easier for the golfer to identify and retrieve as needed. All 14 club slots in the upper retainer 11a are mirror images to all 14 club slots found in upper chassis 10a directly below as shown in FIG. 14. Elastomeric liner 11c shown in FIG. 14 also has 14 club slots, each of which comprising set of four bendable flaps (see FIG. 9) affixed at quadrants within each slot, (the exception the larger putter club slot in the lower right corner shown in FIG. 9). The flaps of liner 11c are configured to allow room for the grip of a golf club to pass through, while the club shaft itself will be held by the smaller round-shaped cutout in the center of each club slot that is formed by radiused cutouts in each of the four flaps. This smaller round-shaped cutout is preferably the same size or similar to the size of the diameter of an average golf club shaft. The retainer 11a slots are configured to keep golf clubs in the middle of each club slot, preventing the golf clubs from leaning over to the side and making contact with its neighboring clubs, commonly referred to as chattering. Elastomeric liner 11c is preferably constructed of a compliant material, such as rubber or like polymers or materials. The club protection system 190 is preferably attached to the upper chassis 180 using a series of upper chassis rivet fasteners 10j.

10) Center Chassis Assembly

Figure 15:
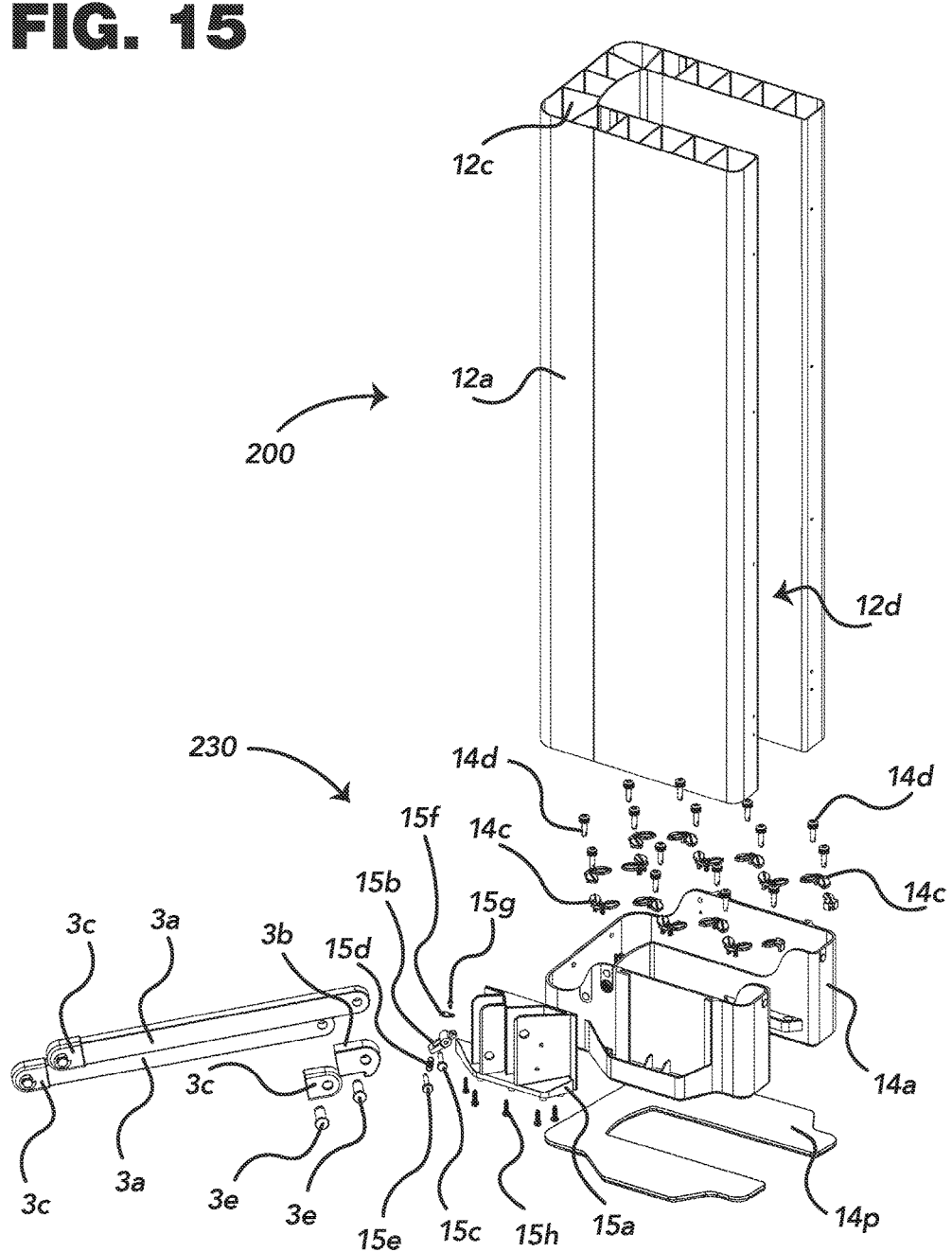
FIG. 15 shows an exploded view of the of the golf cart's center chassis, lower chassis, wing bracket, and trailing arms subassemblies.
Figure 16:
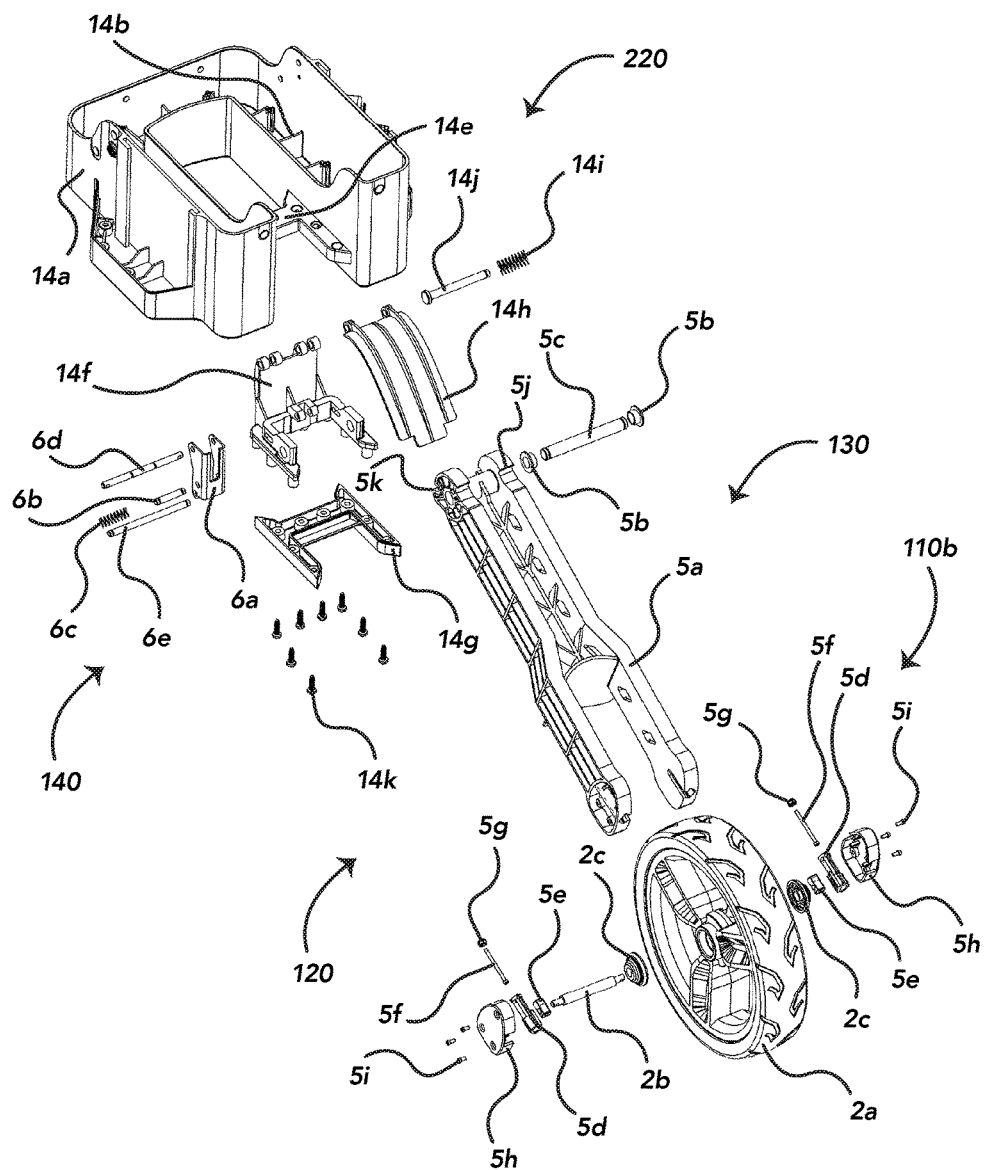
FIG. 16 shows an exploded view of the of the golf cart's lower chassis, front fork lock bracket, center wheel, and front fork subassemblies.

The center chassis assembly 200 comprises a center chassis 12a shown in FIGS. 10, 11, and 15 has a plurality of golf club dividers 12c for all 14 golf club slots. These slots will keep each golf club 17a separated from each other for easy stowing and removal. The golf club dividers 12c extend along the entire vertical length within the center chassis internal walls, partially shown in FIG. 11. Center chassis 12a has a center cavity 12d, which is the open space within the U-shaped clubs slot configuration as shown in FIG. 15. This center cavity provides the space needed to install insulated snack bag 13c and to stow the center wheel 2a when it is in folded position as shown in FIG. 11. Shown in FIG. 7, center chassis 12a also has a series of male snap buttons 12b for attaching the golf bag 13a. Center chassis 12a is attached to the upper chassis 10a using a series of upper chassis male snap buttons 10j and upper chassis rivets 10k. Center chassis 12a is attached to lower chassis 14a (of lower chassis assembly 220) using a series of lower chassis male snap buttons 14m and lower chassis rivets 14n as shown in FIG. 7. While a three-chassis configuration is shown in the present embodiments, it is appreciated that other configurations (e.g. two or singular piece construction) are contemplated. Fastening of the chassis may be implemented via other fastening means (e.g. screws, bolts, adhesives, etc.

11) Golf Bag Assembly

Figure 17:
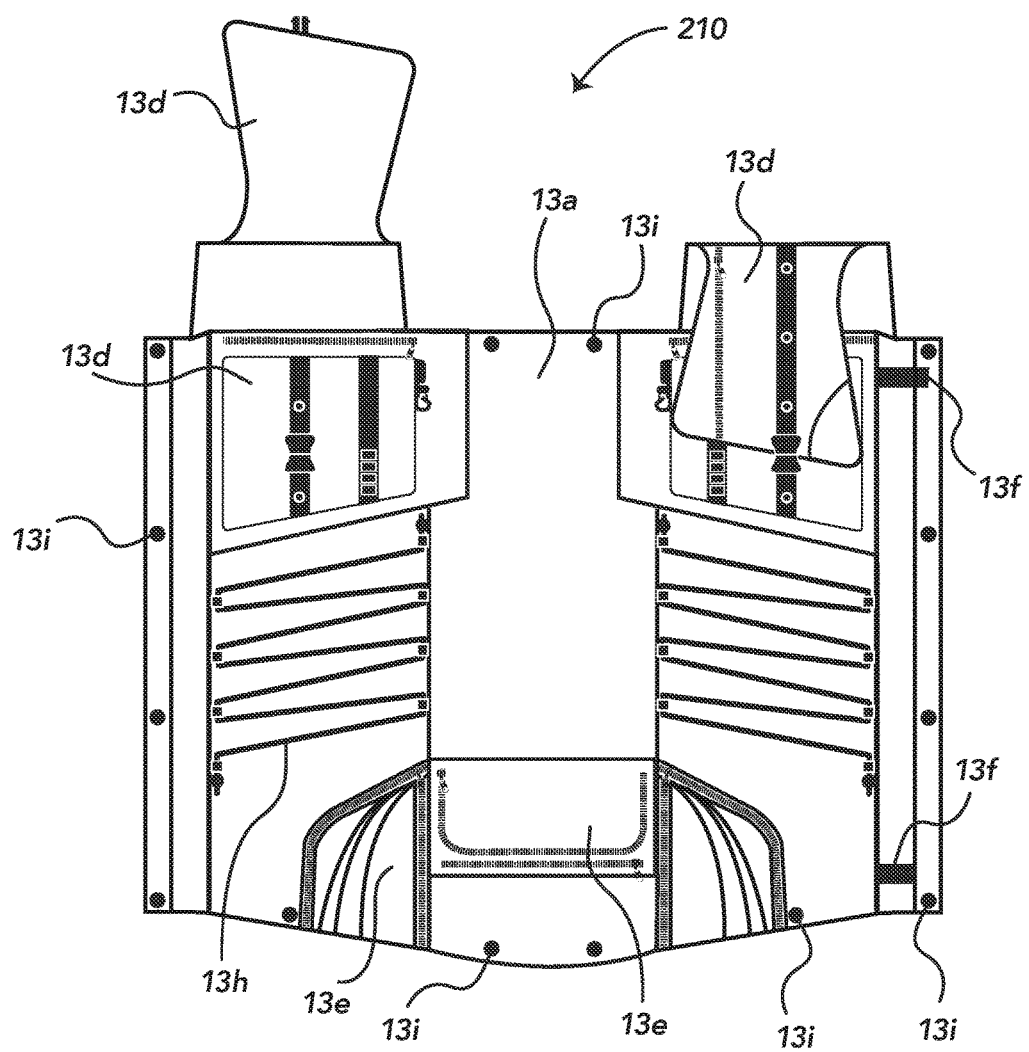
FIG. 17 shows the interchangeable golf bag of the cart shown in FIG. 1, FIG. 2, and FIG. 3.

Golf bas assembly 210 comprises a main golf bag 13a, and is generally shown in FIGS. 1, 3, and 17. Golf bas assembly 210 has multiple upper utility pockets 13d, lower utility pockets 13e, umbrella straps 13f, and quick strap storage system 13h. The golf bas assembly 210 is attached to the cart 100 using a series of female snap buttons that mate with male snap buttons 10j, 12b, and 14m. The golf bas assembly 210 provides the storage space needed for golf related accessories. The golf bag assembly 210 generally provides no structural support for the cart 100. Therefore, it is designed to easily removable for cleaning or replaced with different bag colors for customized personalization. FIG. 17 shows the golf bag assembly 210 in isolation. in a preferred embodiment, the golf bag assembly 210 is made of soft sewn material such as fabric.

12) Lower Chassis Assembly

The lower chassis assembly 220 comprises a lower chassis 14a as shown in FIGS. 7, 11, and 15, and includes a series of golf club dividers 14b, lower club protection system 14c, club protection system fasteners 14d, front fork mount bracket 14e, front fork mount bracket top cover 14f, front fork mount bracket bottom cover 14g, mount bracket fasteners 14k, front fork hinged cover 14h, hinged cover spring 14i, hinged cover pivot axle 14j, lower chassis male snap buttons 14m, lower chassis rivets 14n, and rubber bottom tread 14p. The lower club protection system 14c, shown in FIG. 15, is designed to protect each golf club by gripping on to the bottom portion of the golf club when it is inserted into the designated club slot. When a golf club 17a gets inserted into 1 of 14 designated club slots, as it makes its way toward the bottom, the grip of the club will push through the flaps of the club protection system 14c, causing them to open wider. The returning force from the flaps applies friction against the grip of the golf club 17a shown in FIG. 11. This friction will keep the golf club 17a secure, and preventing it from rattling and chattering in the cart 100. The lower club protection system 14c is attached to the lower chassis 14a using a series of club protection system fasteners 14d shown in FIG. 15. Lower chassis 14a has an integrated front fork mount bracket 14e shown in FIG. 16. The mount bracket 14e is used for the installation of the front fork mount bracket top cover 14f, and front fork mount bracket bottom cover 14g. Both mount bracket covers 14f and 14g are attached to the fork mount bracket 14e using a series of mount bracket fasteners 14k as shown in FIG. 16. The mount bracket top cover 14f is used for the installation of the front fork 5a by using a front fork pivot axle 5c.

Mount bracket top cover 14f also has a front fork hinge cover 14h as shown in FIG. 16. Hinged cover 14h is designed to cover and protect the front fork lock bracket 6a and related subcomponents. Hinged cover 14h also helps release the front fork 5a from folded to extended position. The hinged cover 14h is attached to the mount bracket top cover using a hinge cover pivot axle 14j shown in FIG. 16. The hinged cover 14h has a spring 14i that applies the outward force onto the front fork 5a, forcing it to pivot forward and down to transition into the extended position. Lower chassis 14a has series of male snap buttons 14m, shown in FIG. 15, for the installation of the golf bag 13a. Shown in FIGS. 8 and 15, a rubber bottom tread 14p is fixed to the bottom of the lower chassis 14a to help with traction and absorb impact when the cart 100 is set on hard ground surfaces. Lower chassis 14a has a U-shaped configuration, which enables the cart 100, in the folded position, to be self-standing while accommodating the weight of a fully loaded cart 100 as shown in FIG. 4. More significantly, U-shaped footprint is compact enough to fit on a standard stowing platform of a motorized riding cart 100 17b, partially shown in FIG. 2. Lower chassis 14a, shown in FIG. 7, is attached to the center chassis 12a through a series of rivet fasteners 14m. Lower chassis 14a together with the center and upper chassis make up the main structure of the golf cart 100 as shown in FIG. 7.

13) Wing Bracket Assembly

Wing bracket assemblies 230 comprise wing brackets 15a as shown in FIGS. 3, 4, and 15, and provide the structural foundation to mount the trailing arms 3a onto the cart 100, allowing them to pivot upward or downward into the desired folded and extended positions. Each wing bracket assembly 230 generally comprises the following components: a set of lock plates 15b, lock plate pivot axles 15c, lock plate springs 15d, lock plate spring pins 15e, trigger cable mount brackets 15f, trigger cable mount bracket fasteners 15g, and wing bracket fasteners 15h. These components help set the trailing arms 3a in the intended folded position shown in FIG. 7 or extended position shown in FIG. 10. The lock plate 15b as shown in FIG. 15 is attached to the wing bracket 15a using a lock plate pivot axle 15c. When the side wheel trigger cable 16i is pulled or released, the lock plate 15b pivots within the constraint of the intended space of the wing bracket 15a. The trailing arm trigger cable 16g is anchored to the wing bracket 15a using the trigger cable mount bracket 15f and fasteners 15g. The lock plate spring 15d helps this pivoting action of the lock plate 15b. The lock plate spring 15d is attached to the wing bracket 15a at the lock plate spring hole and the lock plate spring pin 15e as shown in FIG. 15. Wing brackets 15a are attached to the lower chassis 14a using a series of wing bracket fasteners 15h also shown in FIG. 15.

14) Side Trigger Assembly

Side trigger assemblies 240 are generally shown in FIGS. 7, 9, and 14, and are configured to activate the lock and unlocking components of the side wheels 1a and center wheel 2a. Side trigger assembly has a set of side triggers 16a, side trigger main housing 16b, main housing covers 16c, side trigger springs 16d, side trigger housing fasteners 16e, side trigger cable springs 16f, trailing arm trigger cables 16g, front fork trigger cables 16h, side trigger cable clips 16i. Side trigger main housing 16b is attached to the upper chassis 10a using a series of fasteners 15e as shown in FIG. 14. Side triggers 16a are enclosed inside the main housing 16b and is concealed by the main housing cover 16c. shown in FIG. 7. Main housing cover 16c is installed onto the main housing 16b using a series of housing cover fasteners 16e. Side trigger springs 16d are installed onto the side triggers 16a to provide a return force to the side triggers 16a when they are pulled upward. A set of trailing arm trigger cables 16g and front fork trigger cables 16h are fixed onto the side triggers 16a as shown in FIG. 14. The trigger cables 16g and 16h are equipped with a set of trigger cable springs 16f shown in FIG. 14. The trigger cable springs 16f are installed at the end tips of trigger cables 16g and 16h. They act as a buffer when the side triggers 16a are pulled to activate the locking components. The trigger cables 16g and 16h are secured to the side of the center chassis 12a using a series of cable clips 16i shown in FIGS. 7 and 10.

15) Cart Usage.

To use the cart 100 proficiently, the user should be able to lift about 35-40 pounds of weight off the ground. Although the cart 100 itself is configured to be compact and lightweight, the golf clubs and golf-related items can add up. To use the cart 100, assuming it is fully assembled and in a folded position, the user will insert a set of clubs 17a, up to 14 golf clubs total into the club slots 11*d* and 11*e* as shown in FIG. 9. All irons and longer clubs such as a driver and fairway woods/hybrid should be inserted into the perimeter golf club slots 11*d*. The two shorter clubs such as wedges should be inserted into the center golf club slots 11*e* for reasons previously explained. The putter will need to be inserted in the largest slot, adjacent to the two center club slots 11*e*. The next step is to load the golf-related items into the various pockets on the golf bag 13*a*. Shown in FIGS. 1, 5, and 11, more golf items can be stored in the insulated cooler bag 13*b*, snack bag 13*c*, quick strap storage system 13*h*, and push bar tray console 9*a*. At the folded position, the cart 100 is ready to be used for riding on a motorized cart 100 or be stowed away in vehicles or lockers. To use it on a motorized riding cart 100 17*b*, strap the cart 100 on with the impact bumper 10*d* pressed against the back of the motorized riding cart 100 17*b* as shown in FIG. 2. The cart 100 strap 17*c* is to be strapped just under the side handles 10*c* of the upper chassis 10*a*. The strap should continue wrapping around the rear end of the upper chassis 10*a*, sliding through the cart 100 strap cover 10*e* shown in FIG. 14. From here, the cart 100 strap 17*c* can then be fastened, securing the folded cart 100 onto the back of the motorized riding cart 100 17*b* as shown in FIG. 2.

To transform the cart 100 from a folded to extended position for walking, the following steps should be sequentially followed:

1. Place the folded cart 100 on a spacious and flat surface.
2. Pull side triggers 16*a* to release center wheel 2*b* then release the side triggers 16*a*.
3. Unclamp clips 7*g* on stabilizer bars 7*a* then manually pull side wheels 1*a* down to the ground while leaving the clips 7*g* unclamped.
4. Grip side handles 10*c* and lift entire cart 100 off the ground until all wheels 1*a* and 2*a* are airborne then set it back down on the ground.
5. Clamp down all clips 7*g* on stabilizer bars 7*a*
6. Use adjustment lever 8*b* to adjust push bar 8*a* to desired height for walking.

The multi-wheeled cart 100 is now self-stabled and ready to roam the course.

To transform the cart 100 from an extended to folded position for storage or riding on a motorized cart 100, the following steps should be sequentially followed:

1. Unlatch all clips 7*g* on stabilizer bars 7*a*
2. Grip side handles 10*c* and lift entire cart 100 off the ground, pull side triggers 16*a* while the cart 100 is airborne, then set the cart 100 back on the ground while still holding on to the side triggers 16*a*.
3. Release triggers 16*a* and lift center wheel 2*a* until it is tucked within the center chassis cavity 12*d*.
4. Lift side wheels 1*a* up until they snap against the sides of the center chassis 12*a*.
5. Clamp down all clips 7*g* on stabilizer bars 7*a*.
6. Use adjustment lever 8*b* to fold pushbar 8*a* all the way down against the back of the center chassis 12*a*.

Figure 8:
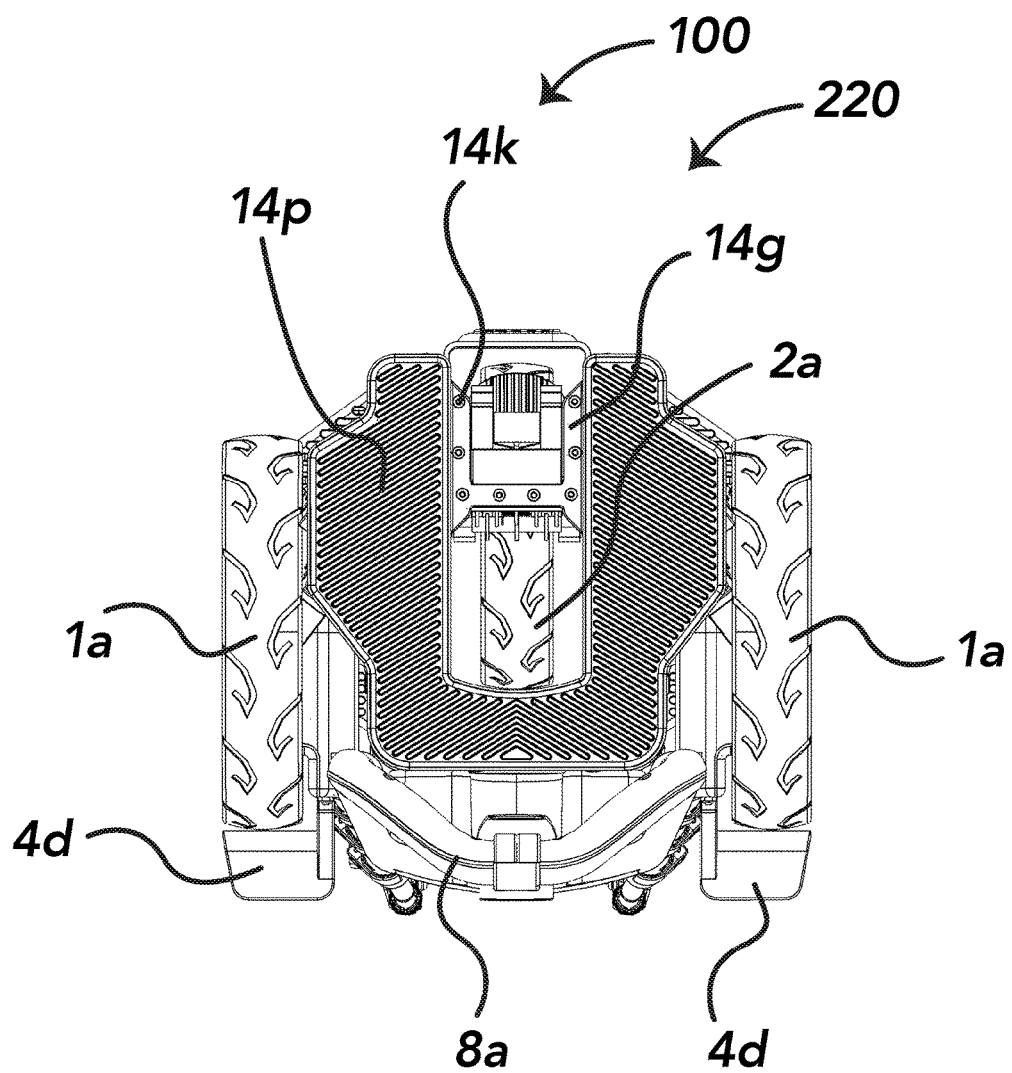
FIG. 8 shows a bottom view of the cart of FIG. 5 in a folded position for storage and riding (golf bag and equipment are not shown).

At this folded position shown in FIG. 7, the cart 100 can firmly stand on its own using the U-shaped base shown in FIG. 8. Also shown in FIGS. 8 and 15, lower chassis rubber tread 14*p* provides traction and rigidity for the folded cart 100 while it is in standing position.

As shown in FIG. 1 an umbrella 17*d* can be installed to provide shading and shelter as needed using an adjustable umbrella holder 8*p* also shown in FIG. 1. The base of the umbrella holder 8*p* has a short stud (not shown) that screws on to the umbrella holder mount insert 8*q* in FIGS. 5 and 13.

As described above, the cart 100 is equipped with a foot brake assembly 120 shown in FIGS. 3 and 12. The foot brake 120 allows occasional parking when the cart 100 is used in the extended position for walking as shown in FIG. 3. To set the foot brake, apply downward force onto brake pedal 4*d* by stepping on it. The brake stop pin 4*f* will engage with the brake disk 4*j*, shown in FIG. 12, and stop the side wheels 1*a* from rotating. To release the foot brake 4*d*, apply downward force onto brake pedal 4*d* by stepping on it again. This will activate the brake pin subcomponents 4*g*-4*i*, making the brake stop pin 4*f* retract and disengaged from the brake disk 4*j*.

The collapsible mechanism of the cart of the present description can be transformed into a folded or extended position in very few and simple operational steps. It provides a better fit on motorized riding carts compared to conventional golf bags which twist, turn, & flop out of place during the round. The cart also comprises braking capability, which allows the golfer to set the cart in park as needed during the round. The cart saves storage space by having just one piece of equipment that does both jobs. The cart provides a walking cart that will fit golfers with various heights through the use of an adjustable push-bar. A secure club protection system is also provided within the cart. A convenient storage console may also be provided for housing essential golf accessories within arm's reach during walking mode. The cart provides strategic arrangement of clubs for optimized organization. The cart provides a broad wheelbase, at the extended position, for stability when rolling around the unpredictable golf course's terrains.

The cart of the present description provides at least the following advantages:

1) saves set up time as the cart folds & unfolds in seconds;
2) avoids having to carry the heavy golf bag over-shoulder;
3) provides a solution for those that are nurturing or coming back from injuries;
4) bypasses the bag drop area or driving the motorized cart to your car just to drop off your cumbersome golf bag;
5) comprises a smaller storage footprint compared to standard bags and pushcarts;
6) provides the option to walk the course with your own gear even on vacations;
7) with the multi wheel design, the cart is self-stabilized, thus making it easy to maneuver, and allowing the cart to run on its own with forward momentum or going down the slopes on the golf course;
8) allows the golfer to have convenient access to the three of the most used golf clubs in a round of golf, the putter and wedges, via three slots that are located in the rear of the cart, closest proximity to the golfer's reach;
9) allows for different bag colors and style options for customized personalization; and
10) saves money on buying an extra push cart or renting one at the golf course.

From the description herein, it will be appreciated that the present disclosure encompasses multiple embodiments which include, but are not limited to, the following:

1. A combination golf bag and golf cart, comprising: a chassis; the chassis having a lower end and an upper end with a plurality of slots, each of the slots oriented for individually holding a plurality of golf clubs vertically within the chassis along at least a substantial portion of a length of the chassis; the chassis comprising a U-shaped or V-shaped housing comprising one open end that extends along at least a portion of the length of the chassis; a plurality of retractable wheel assemblies rotatably coupled to the chassis so as to be movable between a folded storage position and an extended walking position; wherein the plurality of retractable wheel assemblies comprise a center wheel assembly comprising a fork and a center wheel disposed at a distal end of the fork, the fork comprising a proximal end rotatably attached at a first surface the lower end of the chassis; wherein the plurality of retractable wheel assemblies further comprise a pair of rear wheel assemblies, each rear wheel assembly comprising a trailing arm and a respective rear wheel disposed at a distal end of each trailing arm, the trailing arms having proximal ends rotatably attached at second and third opposing surfaces the lower end of the chassis; wherein in the extended walking position the retractable wheel assemblies extend outward from the chassis such that the center wheel extends from the chassis in a direction opposite from an extension of the rear wheels from the chassis, the retractable wheel assemblies being oriented such that the center wheel and rear wheel forming a three-point contact with a ground surface while the retractable wheel assemblies bear the weight of the chassis and any contents disposed therein; and wherein in the extended walking position the retractable wheel assemblies are retracted inward toward the chassis, the center wheel assembly being disposed at least partially inside the open end of the U-shaped or V-shaped housing and the wheel assemblies being disposed at or near respective second and third opposing surfaces.

2. The apparatus or method of any of the preceding or subsequent embodiments, further comprising: a push bar assembly rotatably coupled to the upper end of the chassis; the push bar assembly being collapsible between a folded storage position and an extended walking position; wherein in the extended walking position the push bar assembly extends opposite extension of the center wheel assembly.

3. The apparatus or method of any of the preceding or subsequent embodiments, wherein the push bar assembly comprises a clamp assembly configured to releasably lock at a plurality of differing height positions with respect to the chassis.

4. The apparatus or method of any of the preceding or subsequent embodiments, wherein the plurality of slots are distributed to comprise a perimeter set of slots disposed at long ends of the U-shaped or V-shaped housing and a set of center club slots disposed between the perimeter slots.

5. The apparatus or method of any of the preceding or subsequent embodiments, wherein one or more of the slots comprises a set of compliant flaps configured to retain one of the plurality of golf clubs in a centered location within a respective slot.

6. The apparatus or method of any of the preceding or subsequent embodiments, wherein the center wheel and rear wheels are oriented substantially parallel with each other when in the extended walking position.

7. The apparatus or method of any of the preceding or subsequent embodiments; wherein said chassis comprises an upper chassis, center chassis, and lower chassis, said center chassis extending between said upper chassis and said lower chassis, said center chassis fixed to said upper chassis and said lower chassis; and wherein the push bar assembly is rotatably attached to the upper chassis and the retractable wheel assemblies are rotatably attached to the lower assembly.

8. The apparatus or method of any of the preceding or subsequent embodiments, further comprising: a locking mechanism at each of the retractable wheel assemblies; wherein the locking mechanism is configured to retain a respective retractable wheel assembly to be locked in either the folded storage position or extended walking position; and a trigger assembly remotely coupled to the locking mechanism of the retractable wheel assemblies; wherein engagement of the trigger assembly disengages the locking mechanisms to allow motion of the retractable wheel assemblies from the folded storage position to the extended walking position or from the extended walking position to the folded storage position.

9. The apparatus or method of any of the preceding or subsequent embodiments, further comprising: one or more releasable foot brakes coupled to one or more of the center wheel or rear wheels; the one or more releasable foot brakes having a locked configuration to inhibit rotation of one or more of the center wheel or rear wheels.

10. The apparatus or method of any of the preceding or subsequent embodiments, the chassis comprising a center cavity sized to allow placement of a detachable bag configured for retention of one or more articles.

11. A golf club retaining apparatus, comprising: a chassis having a lower end and an upper end with a plurality of slots, each of the slots oriented for individually holding a plurality of golf clubs vertically within the chassis along at least a substantial portion of a length of the chassis; the chassis comprising a U-shaped or V-shaped housing comprising one open end that extends along at least a portion of the length of the chassis; a plurality of retractable wheel assemblies rotatably coupled to the chassis so as to be movable between a folded storage position and an extended walking position; wherein the plurality of retractable wheel assemblies comprise a center wheel assembly comprising a fork and a center wheel disposed at a distal end of the fork, the fork comprising a proximal end rotatably attached at a first surface the lower end of the chassis; wherein the plurality of retractable wheel assemblies further comprise a pair of rear wheel assemblies, each rear wheel assembly comprising a trailing arm and a respective rear wheel disposed at a distal end of each trailing arm, the trailing arms having proximal ends rotatably attached at second and third opposing surfaces the lower end of the chassis; wherein in the extended walking position the retractable wheel assemblies extend outward from the chassis such that the center wheel extends from the chassis in a direction opposite from an extension of the rear wheels from the chassis, the retractable wheel assemblies being oriented such that the center wheel and rear wheel forming a three-point contact with a ground surface while the retractable wheel assemblies bear the weight of the chassis and any contents disposed therein; wherein in the extended walking position the retractable wheel assemblies are retracted inward toward the chassis, the center wheel assembly being disposed at least partially inside the open end of the U-shaped or V-shaped housing and the wheel assemblies being disposed at or near respective second and third opposing surfaces; a push bar assembly rotatably coupled to the upper end of the chassis; the push bar assembly being collapsible between a folded storage position and an extended walking position; and wherein in the extended walking position the push bar assembly extends opposite extension of the center wheel assembly.

12. The apparatus or method of any of the preceding or subsequent embodiments, wherein the push bar assembly comprises a clamp assembly configured to releasably lock at a plurality of differing height positions with respect to the chassis.

13. The apparatus or method of any of the preceding or subsequent embodiments, wherein the plurality of slots are distributed to comprise a perimeter set of slots disposed at long ends of the U-shaped or V-shaped housing and a set of center club slots disposed between the perimeter slots.

14. The apparatus or method of any of the preceding or subsequent embodiments, wherein one or more of the slots comprises a set of compliant flaps configured to retain one of the plurality of golf clubs in a centered location within a respective slot.

15. The apparatus or method of any of the preceding or subsequent embodiments, wherein the center wheel and rear wheels are oriented substantially parallel with each other when in the extended walking position.

16. The apparatus or method of any of the preceding or subsequent embodiments; wherein said chassis comprises an upper chassis, center chassis, and lower chassis, said center chassis extending between said upper chassis and said lower chassis, said center chassis fixed to said upper chassis and said lower chassis; and wherein the push bar assembly is rotatably attached to the upper chassis and the retractable wheel assemblies are rotatably attached to the lower assembly.

17. The apparatus or method of any of the preceding or subsequent embodiments, further comprising: a locking mechanism at each of the retractable wheel assemblies; wherein the locking mechanism is configured to retain a respective retractable wheel assembly to be locked in either the folded storage position or extended walking position; and a trigger assembly remotely coupled to the locking mechanism of the retractable wheel assemblies; wherein engagement of the trigger assembly disengages the locking mechanisms to allow motion of the retractable wheel assemblies from the folded storage position to the extended walking position or from the extended walking position to the folded storage position.

18. The apparatus or method of any of the preceding or subsequent embodiments, further comprising: one or more releasable foot brakes coupled to one or more of the center wheel or rear wheels; the one or more releasable foot brakes having a locked configuration to inhibit rotation of one or more of the center wheel or rear wheels.

19. The apparatus or method of any of the preceding or subsequent embodiments, the chassis comprising a center cavity sized to allow placement of a detachable bag configured for retention of one or more articles.

20. The apparatus or method of any of the preceding or subsequent embodiments, first and second stabilizer assemblies coupled to distal ends of the rear wheel assemblies and the chassis, the first and second stabilizer assemblies providing support for the rear wheel assemblies.

21. A method of retaining a plurality of clubs within a combination golf bag and golf cart having a chassis and plurality of retractable wheel assemblies, the method comprising: positioning each of the plurality of golf clubs vertically within a respective slot from among a plurality of slots located at an upper end of the chassis, each of the golf clubs housed within at least a substantial portion of a length of the chassis a chassis defined by a lower end and the upper end; the chassis comprising a U-shaped or V-shaped housing comprising one open end that extends along at least a portion of the length of the chassis; the plurality of retractable wheel assemblies rotatably coupled to the chassis so as to be movable between a folded storage position and an extended walking position; wherein the plurality of retractable wheel assemblies comprise a center wheel assembly comprising a fork and a center wheel disposed at a distal end of the fork, the fork comprising a proximal end rotatably attached at a first surface the lower end of the chassis; wherein the plurality of retractable wheel assemblies further comprise a pair of rear wheel assemblies, each rear wheel assembly comprising a trailing arm and a respective rear wheel disposed at a distal end of each trailing arm, the trailing arms having proximal ends rotatably attached at second and third opposing surfaces the lower end of the chassis; releasing the retractable wheel assemblies from the folded storage position to the extended walking position by extending the retractable wheel assemblies outward from the chassis such that the center wheel extends from the chassis in a direction opposite from an extension of the rear wheels from the chassis, the retractable wheel assemblies extending such that the center wheel and rear wheel form a three-point contact with a ground surface while the retractable wheel assemblies bear the weight of the chassis and any contents disposed therein; and releasing the retractable wheel assemblies from the extended walking position to the folded storage position by retracting the retractable wheel assemblies inward toward the chassis, the center wheel assembly being disposed at least partially inside the open end of the U-shaped or V-shaped housing and the wheel assemblies being disposed at or near respective second and third opposing surfaces.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A combination golf bag and golf cart, comprising:
    a chassis;
    the chassis having a lower end and an upper end with a plurality of slots, each of the slots oriented for individually holding a plurality of golf clubs vertically within the chassis along at least a substantial portion of a length of the chassis;
    the chassis comprising a U-shaped or V-shaped housing comprising one open end that extends along at least a portion of the length of the chassis;
    a plurality of retractable wheel assemblies rotatably coupled to the chassis so as to be movable between a folded storage position and an extended walking position;
    wherein the plurality of retractable wheel assemblies comprise a center wheel assembly comprising a fork and a center wheel disposed at a distal end of the fork, the fork comprising a proximal end rotatably attached at a first surface the lower end of the chassis;
    wherein the plurality of retractable wheel assemblies further comprise a pair of rear wheel assemblies, each rear wheel assembly comprising a trailing arm and a respective rear wheel disposed at a distal end of each trailing arm, the trailing arms having proximal ends rotatably attached at second and third opposing surfaces the lower end of the chassis;
    wherein in the extended walking position the retractable wheel assemblies extend outward from the chassis such that the center wheel extends from the chassis in a direction opposite from an extension of the rear wheels from the chassis, the retractable wheel assemblies being oriented such that the center wheel and rear wheel forming a three-point contact with a ground surface while the retractable wheel assemblies bear the weight of the chassis and any contents disposed therein; and
    wherein in the folded storage position the retractable wheel assemblies are retracted inward toward the chassis, the center wheel assembly being disposed at least partially inside the open end of the U-shaped or V-shaped housing and the wheel assemblies being disposed at or near respective second and third opposing surfaces.

2. The combination golf bag and golf cart of claim 1, further comprising:
    a push bar assembly rotatably coupled to the upper end of the chassis;
    the push bar assembly being collapsible between a folded storage position and an extended walking position;
    wherein in the extended walking position the push bar assembly extends opposite extension of the center wheel assembly.

3. The combination golf bag and golf cart of claim 2, wherein the push bar assembly comprises a clamp assembly configured to releasably lock at a plurality of differing height positions with respect to the chassis.

4. The combination golf bag and golf cart of claim 1, wherein the plurality of slots are distributed to comprise a perimeter set of slots disposed at long ends of the U-shaped or V-shaped housing and a set of center club slots disposed between the perimeter slots.

5. The combination golf bag and golf cart of claim 1, wherein one or more of the slots comprises a set of compliant flaps configured to retain one of the plurality of golf clubs in a centered location within a respective slot.

6. The combination golf bag and golf cart of claim 1, wherein the center wheel and rear wheels are oriented substantially parallel with each other when in the extended walking position.

7. The combination golf bag and golf cart of claim 2;
    wherein said chassis comprises an upper chassis, center chassis, and lower chassis, said center chassis extending between said upper chassis and said lower chassis, said center chassis fixed to said upper chassis and said lower chassis; and
    wherein the push bar assembly is rotatably attached to the upper chassis and the retractable wheel assemblies are rotatably attached to the lower assembly.

8. The combination golf bag and golf cart of claim 2, further comprising:
    a locking mechanism at each of the retractable wheel assemblies;
    wherein the locking mechanism is configured to retain a respective retractable wheel assembly to be locked in either the folded storage position or extended walking position; and
    a trigger assembly remotely coupled to the locking mechanism of the retractable wheel assemblies;
    wherein engagement of the trigger assembly disengages the locking mechanisms to allow motion of the retractable wheel assemblies from the folded storage position to the extended walking position or from the extended walking position to the folded storage position.

9. The combination golf bag and golf cart of claim 1, further comprising:
    one or more releasable foot brakes coupled to one or more of the center wheel or rear wheels;
    the one or more releasable foot brakes having a locked configuration to inhibit rotation of one or more of the center wheel or rear wheels.

10. The combination golf bag and golf cart of claim 1, the chassis comprising a center cavity sized to allow placement of at least one a detachable bag configured for retention of one or more articles.

11. A golf club retaining apparatus, comprising:
    a chassis having a lower end and an upper end with a plurality of slots, each of the slots oriented for individually holding a plurality of golf clubs vertically within the chassis along at least a substantial portion of a length of the chassis;
    the chassis comprising a U-shaped or V-shaped housing comprising one open end that extends along at least a portion of the length of the chassis;
    a plurality of retractable wheel assemblies rotatably coupled to the chassis so as to be movable between a folded storage position and an extended walking position;
    wherein the plurality of retractable wheel assemblies comprise a center wheel assembly comprising a fork and a center wheel disposed at a distal end of the fork, the fork comprising a proximal end rotatably attached at a first surface the lower end of the chassis;

wherein the plurality of retractable wheel assemblies further comprise a pair of rear wheel assemblies, each rear wheel assembly comprising a trailing arm and a respective rear wheel disposed at a distal end of each trailing arm, the trailing arms having proximal ends rotatably attached at second and third opposing surfaces the lower end of the chassis;

wherein in the extended walking position the retractable wheel assemblies extend outward from the chassis such that the center wheel extends from the chassis in a direction opposite from an extension of the rear wheels from the chassis, the retractable wheel assemblies being oriented such that the center wheel and rear wheel forming a three-point contact with a ground surface while the retractable wheel assemblies bear the weight of the chassis and any contents disposed therein;

wherein in the folded storage position the retractable wheel assemblies are retracted inward toward the chassis, the center wheel assembly being disposed at least partially inside the open end of the U-shaped or V-shaped housing and the wheel assemblies being disposed at or near respective second and third opposing surfaces;

a push bar assembly rotatably coupled to the upper end of the chassis;

the push bar assembly being collapsible between a folded storage position and an extended walking position; and wherein in the extended walking position the push bar assembly extends opposite extension of the center wheel assembly.

12. The apparatus claim 11, wherein the push bar assembly comprises a clamp assembly configured to releasably lock at a plurality of differing height positions with respect to the chassis.

13. The apparatus claim 11, wherein the plurality of slots are distributed to comprise a perimeter set of slots disposed at long ends of the U-shaped or V-shaped housing and a set of center club slots disposed between the perimeter slots.

14. The apparatus claim 11, wherein one or more of the slots comprises a set of compliant flaps configured to retain one of the plurality of golf clubs in a centered location within a respective slot.

15. The apparatus claim 11, wherein the center wheel and rear wheels are oriented substantially parallel with each other when in the extended walking position.

16. The apparatus claim 11;
wherein said chassis comprises an upper chassis, center chassis, and lower chassis, said center chassis extending between said upper chassis and said lower chassis, said center chassis fixed to said upper chassis and said lower chassis; and
wherein the push bar assembly is rotatably attached to the upper chassis and the retractable wheel assemblies are rotatably attached to the lower assembly.

17. The apparatus claim 11, further comprising:
a locking mechanism at each of the retractable wheel assemblies;
wherein the locking mechanism is configured to retain a respective retractable wheel assembly to be locked in either the folded storage position or extended walking position; and
a trigger assembly remotely coupled to the locking mechanism of the retractable wheel assemblies;
wherein engagement of the trigger assembly disengages the locking mechanisms to allow motion of the retractable wheel assemblies from the folded storage position to the extended walking position or from the extended walking position to the folded storage position.

18. The apparatus claim 11, further comprising:
one or more releasable foot brakes coupled to one or more of the center wheel or rear wheels;
the one or more releasable foot brakes having a locked configuration to inhibit rotation of one or more of the center wheel or rear wheels.

19. The apparatus claim 11, the chassis comprising a center cavity sized to allow placement of a detachable bag configured for retention of one or more articles and a releasable attachment for attachment of a detachable bag to an external surface of the chassis.

20. The apparatus claim 11, further comprising:
at least one stabilizer assembly coupled to distal ends of the rear wheel assemblies and the chassis, and providing support for the rear wheel assemblies.

21. A method of retaining a plurality of clubs within the combination golf bag and golf cart of claim 1, the method comprising:
positioning each of the plurality of golf clubs vertically within a respective slot from among the plurality of slots located at the upper end of the chassis, each of the golf clubs housed within at least the substantial portion of the length of the chassis defined by the lower end and the upper end;
releasing the retractable wheel assemblies from the folded storage position to the extended walking position by extending the retractable wheel assemblies outward from the chassis such that the center wheel extends from the chassis in a direction opposite from an extension of the rear wheels from the chassis, the retractable wheel assemblies extending such that the center wheel and rear wheel form a three-point contact with a ground surface while the retractable wheel assemblies bear the weight of the chassis and any contents disposed therein; and
releasing the retractable wheel assemblies from the extended walking position to the folded storage position by retracting the retractable wheel assemblies inward toward the chassis, the center wheel assembly being disposed at least partially inside the open end of the U-shaped or V-shaped housing and the wheel assemblies being disposed at or near respective second and third opposing surfaces.

* * * * *